(12) United States Patent
Turner et al.

(10) Patent No.: US 10,481,238 B2
(45) Date of Patent: **\*Nov. 19, 2019**

(54) METHODS AND APPARATUS TO GENERATE SITE HEALTH INFORMATION

(71) Applicant: ZEBRA TECHNOLOGIES CORPORATION, Lincolnshire, IL (US)

(72) Inventors: Belinda Turner, Germantown, MD (US); Thomas Dorris, Frederick, MD (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,235

(22) Filed: Feb. 15, 2019

(65) Prior Publication Data

US 2019/0178975 A1 Jun. 13, 2019

Related U.S. Application Data

(63) Continuation of application No. 15/354,554, filed on Nov. 17, 2016, now Pat. No. 10,247,806.

(51) Int. Cl.
| | |
|---|---|
| *H04W 24/00* | (2009.01) |
| *G01S 5/02* | (2010.01) |
| *G01S 19/39* | (2010.01) |

(52) U.S. Cl.
CPC ............ *G01S 5/021* (2013.01); *G01S 5/0205* (2013.01); *G01S 5/0294* (2013.01); *G01S 19/39* (2013.01); *G01S 5/0221* (2013.01)

(58) Field of Classification Search
CPC ...... G01S 5/021; G01S 5/0205; G01S 5/0294; G01S 5/0221; G01S 19/39
See application file for complete search history.

(56) References Cited

U.S. PATENT DOCUMENTS

| | | |
|---|---|---|
| 2013/0021206 A1 | 1/2013 | Hach |
| 2014/0362120 A1 | 12/2014 | Wohl et al. |
| 2015/0046362 A1 | 2/2015 | McNamara et al. |
| 2015/0149837 A1 | 5/2015 | Alonso |
| 2016/0048789 A1 | 2/2016 | Jones et al. |
| 2016/0097837 A1 | 4/2016 | Richley |
| 2018/0136307 A1* | 5/2018 | Turner ................... G01S 5/021 |

\* cited by examiner

*Primary Examiner* — Barry W Taylor

(57) ABSTRACT

Methods and apparatus for generating site health information are disclosed herein. An example apparatus is configured to generate a hub quality matrix, wherein the apparatus comprises a processor and memory including machine-readable instructions that, when executed, cause the processor to generate the hub quality matrix using at least two values of a data quality value based on the received location data, a receiver health value based on a receive rate of respective ones of the receivers, a locate gap value based on amounts of time between location estimations, a locate rate value based on a ratio of a first amount of the location estimations and a second amount of tracked participants at the site, and to output the hub quality matrix.

19 Claims, 16 Drawing Sheets

| SITE | HUB QUALITY MATRIX | DQI HEALTH | RX HEALTH | LOCATE HEALTH | LOCATE RATE |
|---|---|---|---|---|---|
| | TIME PERIOD: 1 2 3 4 5 6 7 8 9 10 11 12 | | | | |
| A | ▂▃▅▇▅▂▁▂▅▃▁ 88 | 0.22 | 13.2 | 99 | 94 |
| B | ▂▁▃▂▅▃▂▁▃▂ 87 | 0.31 | 13.1 | 86 | 88 |
| C | ▃▂▁▃▂▁▂▃▁ 85 | 0.30 | 12.1 | 61 | 81 |

600

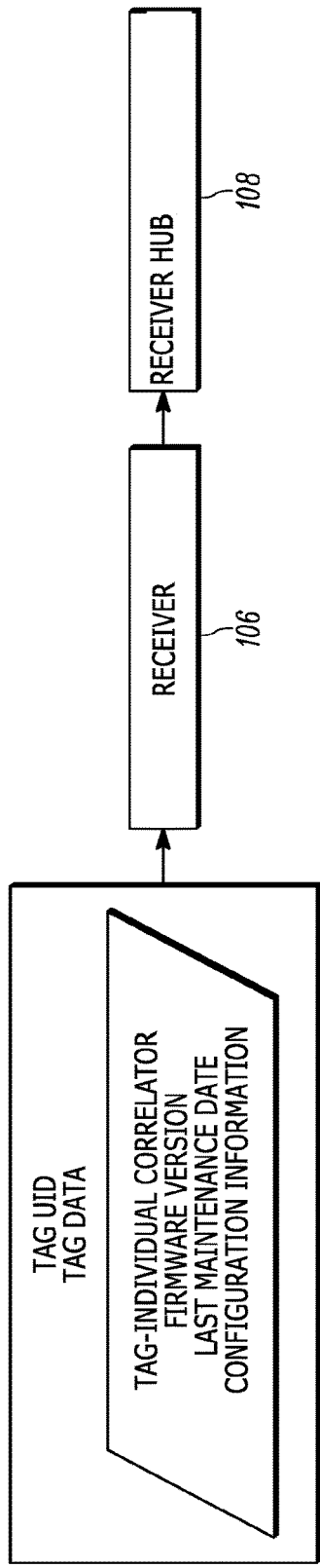
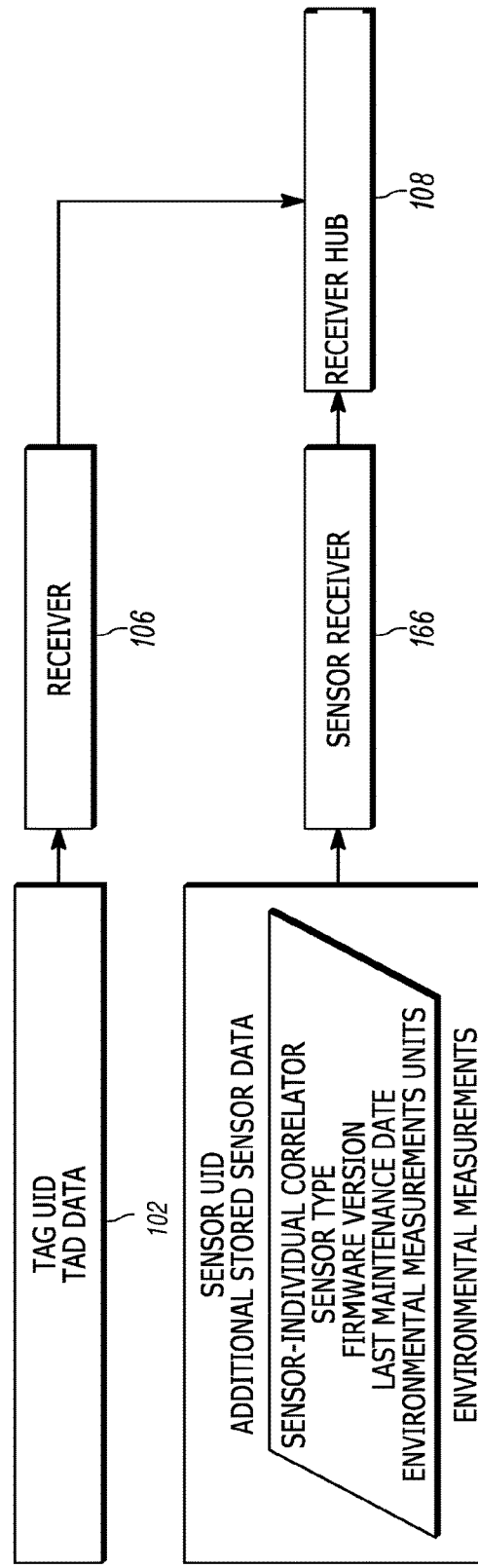

METHODS AND APPARATUS TO GENERATE SITE HEALTH INFORMATION

RELATED APPLICATION

This patent arises from a continuation of U.S. patent application Ser. No. 15/354,554, filed Nov. 17, 2016, now U.S. Pat. No. 10,247,806, which is hereby incorporated herein by reference in its entirety.

FIELD

Example methods and apparatus disclosed herein are related to radio frequency locating and, more particularly, to methods and apparatus for generating site health information.

BACKGROUND

Information indicative of movement and location of persons, animals, machines and/or objects can be leveraged for different purposes, such as determining activity and/or characteristics of the activity.

BRIEF DESCRIPTION OF THE DRAWINGS

FIGS. 3A-3E are block diagrams showing input and output of receivers and sensor receivers;

DETAILED DESCRIPTION

Overview

Figure 1:
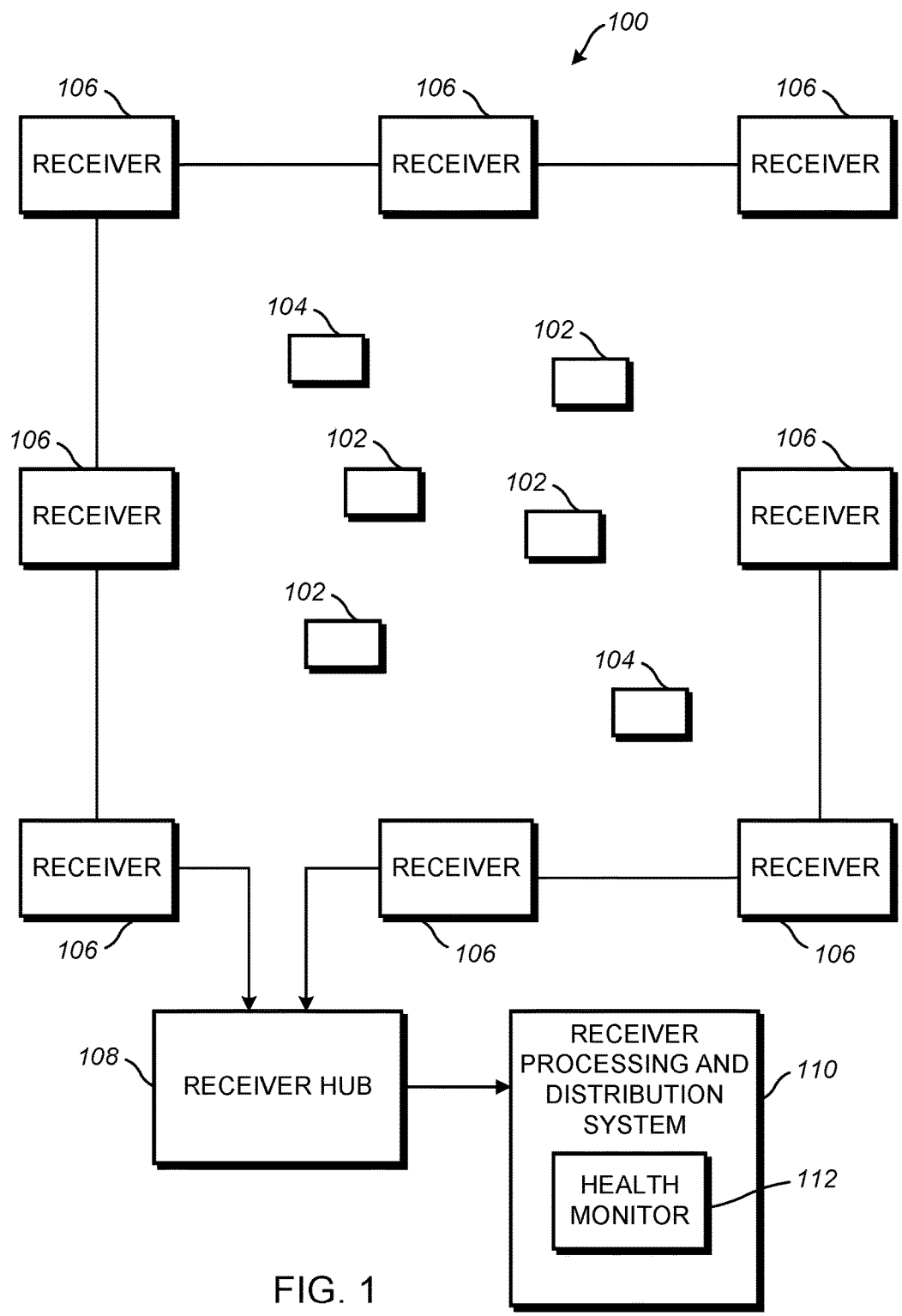
FIG. 1 illustrates a schematic representation of an example radio frequency locating system deployed at a site monitored by an example health monitor constructed in accordance with teachings of this disclosure.

Locating systems are used in variety of environments and applications to locate and/or track people, animals, machines, items and/or other objects of interest at one or more sites. Some locating systems provide real-time collection of data and, in some instances, real-time analysis of the data. For example, a locating system may use radio frequency locating technology to generate data indicative of location, change in location, velocity, change in acceleration, orientation, or the like, for one or more participants of a site at which the locating system is deployed. The term "participant" as used herein refers to people, animals, objects, machines, devices, and any other movable object.

Some systems provide simultaneous tracking of a plurality of participants and provide, for example, indications of statistics in real time (or near real time). Such indications may be output to a variety of systems including, without limitation, a visualization system (e.g., an enhanced television broadcast system or computer graphics visualization system), an operations system, a control system, an analytics system, and a statistics system. Some systems calculate statistical data and analytic data based on location data associated with participants and other various sensors. The analytic data and/or statistical data may also be output a visualization of the monitored activity. In some instances, the participant location over time and analytical/statistical data may be output in a combined visualization.

Entities utilize the data and/or the analyses provided by the locating system to, for example, control, assess, and/or manage operations and/or processes associated with the corresponding site. Additionally or alternatively, entities utilize the data and/or the analyses provided by the locating system to evaluate operations and/or processes associated with the site. As such, the entities that utilize the data and/or analyses provided by the locating system benefit from information indicative of performance and/or status of the locating system.

Moreover, a system management entity tasked with installing and/or maintaining the locating system benefits from information indicative of performance and/or status of the locating system. In some instances, the system management entity is tasked with installing and/or maintaining multiple locating systems deployed at multiple sites. Gathering information indicative of performance and/or status of the multiple locating systems is challenging due to, for example, system complexity, changing conditions at the different sites, and difficulties associated with providing real-time data and/or analysis.

Example methods and apparatus disclosed herein generate information that quantifies performance and/or status of one or more locating systems deployed at one or more sites. The quantification of performance and/or status information generated by examples disclosed herein, which may be referred to as site health information, represents one or more aspects of the corresponding locating system. For example, the site health information measures performance of hardware (e.g., tags, receivers, and/or hubs) and/or software applications. The site health information generated by examples disclosed herein improves, for example, an ability of the system management entity to identify issues and quickly address the same.

In addition to generating the site health information, examples disclosed herein provide visualizations of the site health information via a graphical user interface (GUI). As descried in detail below, example GUIs disclosed herein provide visualizations of site health information for multiple locating systems deployed at multiple sites. As such, entities utilizing examples disclosed herein are provided with a comprehensive view of the multiple sites, as well as an ability to readily evaluate the individual sites.

Figure 4:
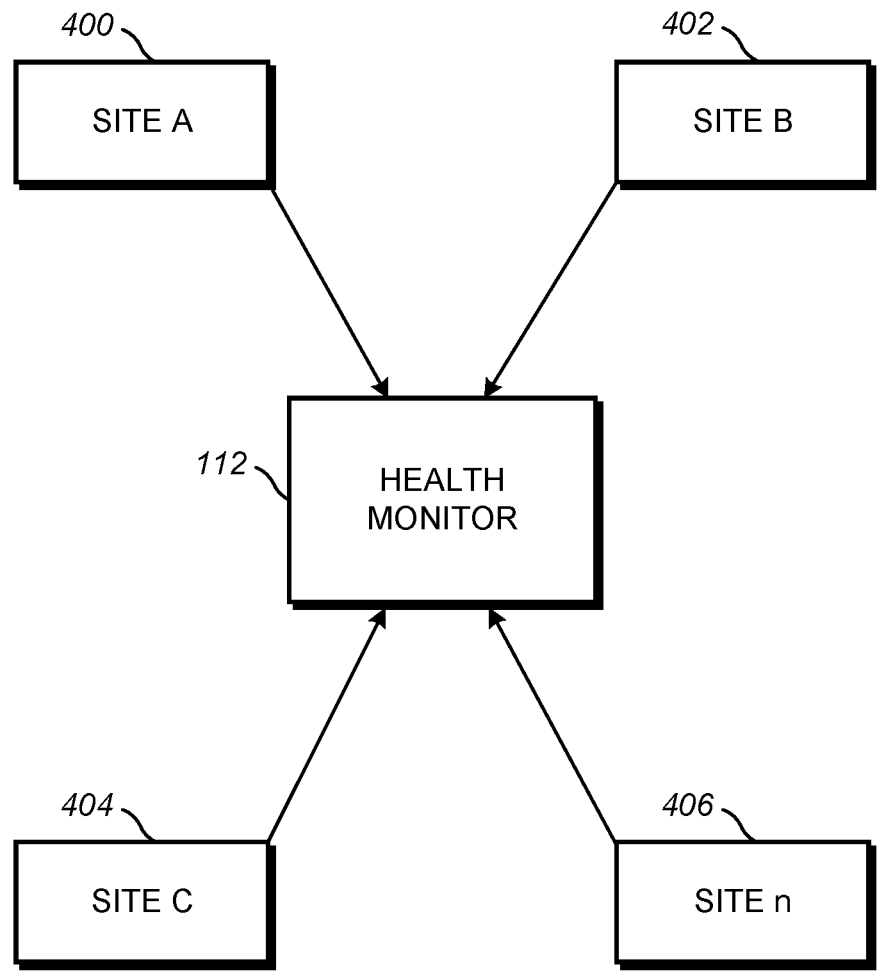
FIG. 4 illustrates the example health monitor of FIG. 1 in communication with multiple sites.

For example, the system health monitor 408 of FIG. 4 provides specific data related to hardware (e.g., sensors, receivers, hubs, etc.) and software applications. In the illustrated example, the system health monitor 408 generates and/or displays the performance and/or status information statically, dynamically (e.g., in real time), and/or in a combination of static and dynamic operations. In some examples, the system health monitor 408 provides one or more alerts when, for example, a critical threshold has been reached. Entities are made aware of the corresponding issue quickly and, thus, can address the issue quickly.

Example RF Locating System Architecture

FIG. 1 illustrates an exemplary locating system deployed at an example site 100. The example locating system of FIG. 1 calculates a location by an accumulation of location data or time of arrivals (TOAs) at a receiver hub 108, whereby the TOAs represent a relative time of flight (TOF) from real-time location system (RTLS) tags 102 as recorded at each of a plurality of receivers 106. In the example of FIG. 1, the RF location tags 102 are ultra-wide band tags and the receivers 106 are ultra-wide band receivers. A timing reference clock is used, in some examples, such that at least a subset of the receivers 106 may be synchronized in frequency, whereby the relative TOA data associated with each of the RF location tags 102 may be registered by a counter associated with at least a subset of the receivers 106. In some examples, one or more reference tags 104, preferably a UWB transmitter, positioned at known coordinates at the site 100, is used to determine a phase offset between the counters associated with at least a subset of the of the receivers 106. The RF location tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the locating system is configured to provide two-dimensional and/or three-dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the RF location tags 102 operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Such a configuration advantageously satisfies constraints applied by regulatory bodies related to peak and average power densities (e.g., effective isotropic radiated power density ("EIRP")), while still optimizing system performance related to range and interference. In some examples, tag transmissions with a −3 dB bandwidth of approximately 400 MHz yields an instantaneous pulse width of roughly 2 nanoseconds that enables a location resolution to better than 30 centimeters.

In the example of FIG. 1, the RF location tags 102 each have a UWB transmitter that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each of the RF location tags 102 is advantageously provided to permit, at the receiver hub 108, correlation of TOA measurement data from the receivers 106.

In some examples, the tags 102 employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec), that advantageously enables a higher packet rate. In an instance in which each information packet is unique, a higher packet rate results in a higher data rate. In an instance in which each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag results in larger datasets for filtering to achieve a more accurate location estimate. Alternatively or additionally, in some examples, the shorter length of the information packets, in conjunction with other packet rate, data rates and other system requirements, results in a longer battery life (e.g., 7 years battery life at a transmission rate of 1 Hz with a 300 mAh cell).

Signals from the RF location tags 102 may be received at a receiver 106 directly from the RF location tags 102, or after being reflected en route. Reflected signals travel a longer path from the RF location tag 102 to the receiver 106 than would a direct signal, and are thus received later than the corresponding direct signal. This delay is known as an echo delay or multipath delay. In an instance in which reflected signals are sufficiently strong enough to be detected by the receiver 106, the reflected signals can corrupt a data transmission through inter-symbol interference. In some examples, the RF location tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In some examples, a data packet length of 112 bits (e.g., OOK encoded), transmitted at a data rate of 1 Mb/sec (1 MHz), is implemented with a transmit tag repetition rate of 1 transmission per second (1 TX/sec). Such an implementation accommodates a battery life of up to seven years, wherein the battery itself is, for example, a compact, 3-volt coin cell of the series number BR2335 (Rayovac), with a battery charge rating of 300 mAhr. An alternate implementation is a generic compact, 3-volt coin cell, series number CR2032, with a battery charge rating of 220 mAhr, whereby the latter generic coin cell, as can be appreciated, may provide for a shorter battery life.

Alternatively or additionally, some applications require higher transmit tag repetition rates to track a dynamic environment. In some examples, the transmit tag repetition rate may be 12 transmissions per second (12 TX/sec). In such applications, the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the RF location tags 102 to provide the receivers 106 with information about the environment and/or operating conditions of the corresponding RF location tags 102. For example, the RTLS tags may transmit a temperature to the receivers 106. Such information may be valuable, for example, in a system involving perishable goods or other refrigerant requirements. In this example, the temperature is transmitted by the RF location tags 102 at a lower repetition rate than that of the rest of the data packet. For example, the temperature may be transmitted from the RF location tags 102 to the receivers 106 at a rate of one time per minute (e.g., 1 TX/min.), or in some examples, once every 720 times the data packet is transmitted, whereby the data packet in this example is transmitted at an example rate of 12 TX/sec.

Alternatively or additionally, the RF location tags 102 are programmed to intermittently transmit data to the receivers 106 in response to a signal from a magnetic command transmitter (not shown). The magnetic command transmitter may be a portable device, functioning to transmit a 125 kHz signal, in some examples, with a range of approximately 15 feet or less, to one or more of the RF location tags 102. In some examples, the RF location tags 102 are equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as the reference tags 104, are positioned within and/or about a monitored region. In some examples, the reference tags 104 are configured to transmit a signal that is used to measure the relative phase (e.g., the count of free-running counters) of non-resettable counters within the receivers 106.

One or more (e.g., preferably four or more) of the receivers 106 are positioned at predetermined coordinates within and/or around the monitored region. In some examples, the receivers 106 are connected in a "daisy chain" fashion to allow the plurality of receivers 106 to be interconnected over a significant distance while reducing and simplifying cabling, providing power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the RF location tags 102 and the reference tags 104.

In the example of FIG. 1, each of the receivers 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from the receiver hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of one or more of the reference tags 104, e.g. a reference phase offset. Alternatively or additionally, each of the receivers 106 may be synchronized wirelessly via virtual synchronization without a dedicated physical timing channel.

In some examples, the receivers 106 are configured to determine one or more attributes of the received signal. Since measurements are determined at each of the receivers 106, in a digital format, rather than analog in some examples, signals are transmittable to the receiver hub 108. Advantageously, because packet data and measurement results can be transferred at high speeds to a receiver memory, the receivers 106 receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the receiver hub 108 (e.g., the data cables may enable a transfer speed of 2 Mbps).

In some examples, measurement data is transferred to the receiver hub 108 at regular polling intervals.

As such, the receiver hub 108 determines or otherwise computes tag location (i.e., object location) by processing TOA measurements relative to multiple data packets detected by the receivers 106. In some example embodiments, the receiver hub 108 is configured to resolve the coordinates of the RF location tag 102 tag using nonlinear optimization techniques.

In some examples, TOA measurements from multiple ones of the receivers 106 are processed by the receiver hub 108 to determine a location of the RF location tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time to $t_0$ the respective TOA, represents graphically the radii of spheres centered at the respective receivers 106. The distance between the surfaces of the respective spheres to the estimated location coordinates $(x_0, y_0, z_0)$ of the RF location tag 102 represents the measurement error for each respective TOA, and the minimization of the sum of the squares of the TOA measurement errors from each of the receivers 106 participating in the DTOA location estimate provides for both the location coordinates $(x_0, y_0, z_0)$ of the transmit tag and of that tag's transmit time to.

In some examples, the system described herein may be referred to as an "over-specified" or "over-determined" system. As such, the receiver hub 108 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \sum_{j=1}^{N} \left[ [(x-x_j)^2 + (y-y_j)^2 + (z-z_j)^2]^{\frac{1}{2}} - c(t_j - t_0) \right]^2 \quad (1)$$

In an instance in which N is the number of receivers, c is the speed of light, $(x_j, y_j, z_j)$ are the coordinates of the $j^{th}$ receiver, $t_j$ is the arrival time at the $j^{th}$ receiver, and to is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error ε in Equation 1 may be the Davidon-Fletcher-Powell (DFP) quasi-Newton algorithm, for example. In some examples, the optimization algorithm to minimize the error c in Equation 1 may be a steepest descent algorithm. In each case, the algorithms may be seeded with an initial location estimate (x, y, z) that represents the two-dimensional (2D) or three-dimensional (3D) mean of the positions of the receivers 106 that participate in the tag location determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{Rj}, y_{Rj}, z_{Rj})$, which are respectively positioned at distances $d_{Rj}$ from the reference tag 104, such as given in Equation 2:

$$d_{Rj} = \sqrt{(x_{Rj} - x_T)^2 - (y_{Rj} - y_T)^2 + (z_{Rj} - z_T)^2} \quad (2)$$

Each receiver $R_j$ utilizes, for example, a synchronous clock signal derived from a common frequency time base, such as a clock generator. Because the receivers 106 are not synchronously reset, an unknown, but constant offset $O_j$ exists for each receiver's 106 internal free running counter. The value of the constant offset $O_j$ is measured in terms of the number of fine resolution count increments (e.g., a number of nanoseconds for a one nanosecond resolution system).

The reference tag 104 is used, in some examples, to calibrate the radio frequency locating system as follows: The reference tag 104 emits a signal burst at an unknown time $\tau_R$. Upon receiving the signal burst from the reference tag 104, a count $N_{Rj}$ as measured at receiver $R_j$ is given in Equation 3 by:

$$N_{Rj} = \beta\tau_R + O_j + \beta d_{Rj}/c \quad (3)$$

In an instance in which c is the speed of light and β is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta\tau_i + O_j + \beta d_{ij}/c \quad (4)$$

at receiver $R_j$ in an instance in which $d_{ij}$ is the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{Rj} - N_{Rk} = (O_j - O_k) + \beta\left(\frac{d_{Rj}}{c} - \frac{d_{Rk}}{c}\right) \quad (5a)$$

Or, $$(O_j - O_k) = (N_{Rj} - N_{Rk}) - \beta\left(\frac{d_{Rj}}{c} - \frac{d_{Rk}}{c}\right) = \Delta_{jk} \quad (5b)$$

In an instance in which $\Delta_{jk}$ is constant as long as $d_{Rj} - d_{Rk}$ remains constant, (which means the receivers 106 and the reference tag 104 are fixed and there is no multipath situation) and β is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the phase offsets between receivers $R_j$ and $R_k$ may be readily determined based on the reference tag 104 transmissions. Thus, again from the above equations, for an RF location tag 102 ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{j_k} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{j_k}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

In some examples, the location of the RF location tag 102 is output to a receiver processing and distribution system 110 for further processing of the location data to advantageously provide visualizations, predictive analytics, statistics and/or the like. The example receiver processing distribution system 110 of FIG. 1 is implemented at the example site 100. Alternatively, the example receiver processing and distribution system 110 may be located off site. In the example of FIG. 1, a health monitor 112 constructed in accordance with teachings of this disclosure is implemented in the receiver processing and distribution system 110. Example implementations of the health monitor 112 are described in detail below. While shown as a component of the receiver processing and distribution system 110 in the example of FIG. 1, the health monitor 112 may be implemented in association with any suitable system and at any suitable location.

The example radio frequency locating system of FIG. 1 may be used in providing analytic information. In the example of FIG. 1, data may be captured and analyzed to identify events, statistics, and other data useful to an entity utilizing the location system. In some examples, data associated with participants (e.g., people, animals, machines, and/or devices) at the site 100 is generated and provided to an analytics system. As such, as further discussed in connection with FIGS. 2A-B below, each participant carries (e.g., via an attachment to apparel of a person or an animal) one or more of the tags 102 to be used to track data such as location, change of location, speed, or the like of each participant. In some examples, additional sensors, such as, without limitation, accelerometers, magnetometers, time-of-flight sensors, health sensors, temperature sensors, moisture sensors, light sensors, or the like, may be carried by participants to provide further data to, for example, the analytics system. Such additional sensors may provide data to the RF location tag 102, either through a wired or wireless connection, to be transmitted to the receivers 106 or the sensors may be configured to transmit data to receivers (i.e., sensor receivers) separately from the tags 102.

One or more of the receivers 106 receives transmissions from the tags 102 and transmits blink data to the receiver hub 108. In the example of FIG. 1, the receiver hub 108 processes the received data to determine tag location data for the tags 102. The receiver hub 108 may transmit the tag location data to one or more processors, such as the receiver processing and distribution system 110. In the example of FIG. 1, the receiver processing and distribution system 110 uses one or more modules (e.g., processing engines) and one or more databases to identify the participant each of the tags 102 is associated with, such as an object, a person, an animal, or a machine. The example receiver processing and distribution system 110 of FIG. 1 uses one or more databases to associate the tag identifier (e.g., a tag UID) of each RF location tag 102 with each participant and correlate the tag location data and/or other tag and sensor derived data for multiple tags 102 that are associated with the participant.

As discussed in greater detail below, the receiver processing and distribution system 110 uses the tag location data and/or other tag and sensor derived data to determine participant dynamics, such as a participant location, how the location is changing with time, orientation, velocity, acceleration, deceleration, or the like. In some examples, the receiver processing and distribution system 110 uses the data and one or more databases to determine participant formations, participant activity, events, statistics, or the like, such as by comparing the data to various models to determine the most event. The receiver processing and distribution system 110 may use the data to provide statistics or other output data for the participants and/or, more generally, the site 100.

In some examples, the receiver processing distribution system 110 is configured to communicate with an analytics interface system, which may be configured to advantageously provide for the effective visualization of analytic data, such as analytics data, event data, statistical data, or the like. Additionally or alternatively, the receiver processing distribution system 110 includes an analytics system therein. In some examples, the analytics interface system includes an electronic device, such as a laptop computer, tablet computer, smartphone, smart television, electronic book reader, touch surface, and/or the like configured to display an interface providing analytics data corresponding to a particular participant, such as a specific person or a specific object.

As will be apparent to one of ordinary skill in the art, the inventive concepts herein described are not limited to use with the UWB based RF locating system shown in FIG. 1. Rather, in various embodiments, the concepts disclosed herein may be applied to various other locating systems especially those that are configured to provide robust location resolution (i.e., subfoot location resolution).

Example Tag/Sensor Positioning and Participant Correlation

The example site 100 of FIG. 1 includes a monitored area having a plurality of positions at one or more time epochs. The plurality of positions may be divided into one or more regions, called zones. Each zone may be described by one or more coordinate systems, such as a local NED (North-East-Down) system, a latitude-longitude system, or even a marking system particular to the site 100. A location is a description of a position, or a plurality of positions, within the monitored area. For example, a marker at an intersection of two fence lines in a pasture could be described as {0,0,0} in a local NED system, or by particular degrees of latitude and longitude on a latitude-longitude system. Because different types of locating systems or different zones within a single locating system may use different coordinate systems, a Geographical Information System or similar monitored area database may be used to associate location data. One type of Geographical Information System describing at least a monitored area may be called monitored area data.

Exemplary Participants and Location Tag Mounting

Figure 2A:
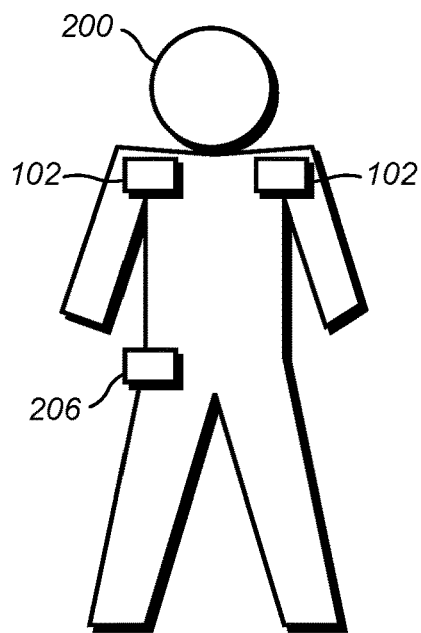
FIG. 2A illustrates a first example participant carrying tags and a sensor.
Figure 2B:
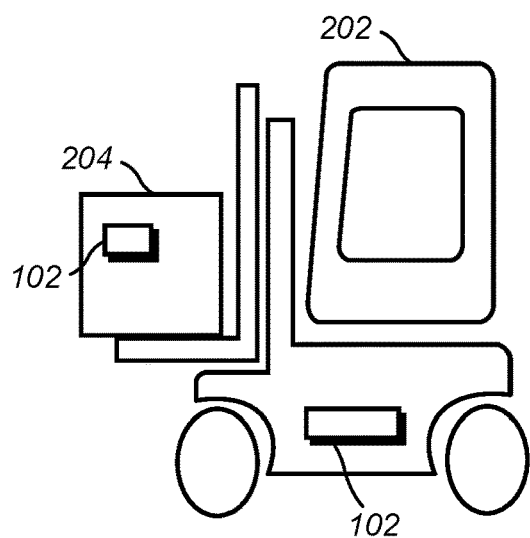
FIG. 2B illustrates a second example participant carrying tags and a sensor.

FIGS. 2A-B illustrate first, second and third exemplary participants 200, 202 and 204, respectively, that provide information to, for example, the locating system of FIG. 1. FIG. 2A illustrates a person 200 (e.g., a shipping port employee) wearing equipment having attached tags 102. In particular, the person 200 is wearing apparel (e.g., a vest) having tags 102 affixed to opposite sides thereof. This positioning advantageously provides an elevated broadcast position for each RF location tag 102 thereby increasing its communication effectiveness.

Additional sensors 206 may be attached to apparel worn by the person 200, such as accelerometers, magnetometers, time-of-flight sensors, health monitoring sensors (e.g., blood pressure sensors, heart monitors, respiration sensors, moisture sensors, temperature sensors), light sensors, or the like.

The sensors 206 may be configured to communicate with the receivers 106 directly or indirectly through tags 102 or other transmitters. For example, the sensor 206 of FIG. 2A is connected, wired (e.g., perhaps through wires sewn into the apparel) or wirelessly, to the tags 102 to provide sensor data to the tags 102, which is then transmitted to the receivers 106. In some examples, a plurality of sensors (not shown) is connected to a dedicated antenna or transmitter, perhaps positioned in other apparel or a computing device carried by the person 200, which may transmit sensor data to one or more of the receivers 106.

FIG. 2B illustrates a forklift 202 carrying a package 204. The forklift 202 and the package 204 each has at least one attached RF location tag 102. In some examples, the forklift 202 and/or the package 204 carry one or more sensors 206.

As discussed in greater detail below, the positioning of sensors 206 (here, accelerometers) on the participants 200-204 allow the receiver processing and distribution system 110 to determine particular motions, movements, or activities of the participants 200-204 for use in determining, for example, events occurring at the site 100.

When the tags 102 and the sensors 203 of FIGS. 2A-2B are positioned on the participants 200-204, the tags 102 and/or the sensors 206 are correlated to the appropriate participant 200-204. For example, unique tag or sensor identifiers ("unique IDs") may be correlated to a participant profile and stored to a remote database accessible to, for example, an analytics system. Each participant profile may further include or be correlated with a variety of data including, but not limited to, biometric data (e.g., height, weight, health data, etc.), role data, statistics, and other data.

Tag ID and Sensor Data Transmission Architecture

FIGS. 3A, 3B, 3C, 3D, and 3E show block diagrams of different architectures that may be utilized in transmitting signals from one or more of the tags 102 and the sensors 206 to one or more of the receivers 106. In some examples, the depicted architectures are used in connection with the receiver processing and analytics system 110 of FIG. 1. More than one of the example architectures of FIGS. 3A-3E may be used together in a single system.

FIG. 3A shows an implementation of one of the tags 102, which is configured to transmit a tag signal to the receivers 106. The one or more receivers 106 may transmit a receiver signal to the receiver hub 108.

The example RF location tag 102 may generate or store a tag unique identifier ("tag UID") and/or tag data as shown. The tag data may include useful information such as the installed firmware version, last tag maintenance date, configuration information, and/or a tag-individual correlator. The tag-individual correlator (e.g. participant name, participant number, biometric data, tag position the participant, such as right wrist, or tag UID) includes data that indicates that a participant is associated with the RF location tag 102. In some examples, the tag-individual correlator is stored to the RF location tag 102 when the RF location tag 102 is registered or otherwise associated with a participant. In some examples, the tag-individual correlator is part of any tag data or even omitted from the RF location tag 102.

The tag signal transmitted from the RF location tag 102 to the receivers 106 may include "blink data" as it is transmitted at selected intervals. A "blink rate" may be set by the tag designer or the system designer to meet application requirements. In some examples, the blink rate is consistent for one or all tags 102. In some examples, the blink rate is data dependent. Blink data includes characteristics of the tag signal that allow the tag signal to be recognized by the receiver 106 so the location of the RF location tag 102 can be determined by the locating system. Blink data may also comprise one or more tag data packets. Such tag data packets may include any data from the RF location tag 102 that is intended for transmission such as, for example, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a RF location tag (e.g., a UWB tag).

The depicted receiver 106 receives the tag signal, which includes blink data and tag data packets as discussed above. In some examples, the receiver 106 passes the received tag signal directly to the receiver hub 108 as part of the receiver signal. In some examples, the receiver 106 performs some basic processing on the received tag signal. For example, the receiver 106 of FIG. 1 extracts blink data from the tag signal and transmit the blink data to the receiver hub 108. The receiver 106 could transmit a time measurement to the receiver hub 108 such as a TOA measurement and/or a TDOA measurement. In some examples, the time measurement is based on a clock time generated or calculated in the receiver 106, or on a receiver offset value as explained in connection with FIG. 1 above. Additionally or alternatively, the time measurement is based on a system time, and/or it could be based on the time difference of arrival between the tag signal of the RF location tag 102 and the tag signal of the reference tag 104. The receiver 106 could additionally or alternatively determine a signal measurement from the tag signal (such as a received signal strength indication (RSSI), a direction of signal, signal polarity, or signal phase) and transmit the signal measurement to the receiver hub 108.

FIG. 3B shows an example implementation of the RF location tag 102 and the sensor 206. The depicted RF location tag 102 includes a tag UID and tag data (such as a tag-individual correlator) and transmits a tag signal comprising blink data as discussed in connection with FIG. 3A above. The depicted sensor 206 generates and/or stores a sensor UID, additional stored sensor data (e.g. a sensor-individual correlator, sensor type, sensor firmware version, last maintenance date, the units in which environmental measurements are transmitted, etc.), and environmental measurements. The "additional stored sensor data" of the sensor 206 may include any data that is intended for transmission, including but not limited to the tag 202, the reference tag 104 of FIG. 1, a sensor receiver, the receivers 106, and/or the receiver hub 108.

The sensor-individual correlator may comprise data that indicates that a participant is associated with the sensor 206 (e.g., participant name, participant number, biometric data, sensor position on individual, e.g., right wrist). The sensor-individual correlator may be stored to the sensor 206 when the sensor 206 is registered or otherwise associated with a participant. While shown as a separate field for illustration purposes, the sensor-individual correlator may be part of any additional stored sensor data or omitted from the sensor 206.

The example sensor 206 is structured to sense or determine one or more environmental conditions (e.g. temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor 206 including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as $\{31\}$, or as $\{33, 32, 27, 22, 20, 23, 27, 30, 34, 31\}$, or as $\{27.9\}$. In some embodiments, the sensor-individual correlator could be determined at least in part from the environmental measurements.

In the illustrated example, the RF location tag 102 transmits a tag signal to the receiver 106 and the sensor 206 transmits a sensor signal to sensor receiver 166. The sensor signal includes one or more sensor information packets. The sensor information packets include any data or information from the sensor 206 intended for transmission such as, for example, sensor UID, additional stored sensor data, sensor-individual correlator, and environmental measurements. A receiver signal from the receiver 106 and a sensor receiver signal from the sensor receiver 166 may be transmitted via wired or wireless communication to the receiver hub 108.

Figure 3C:
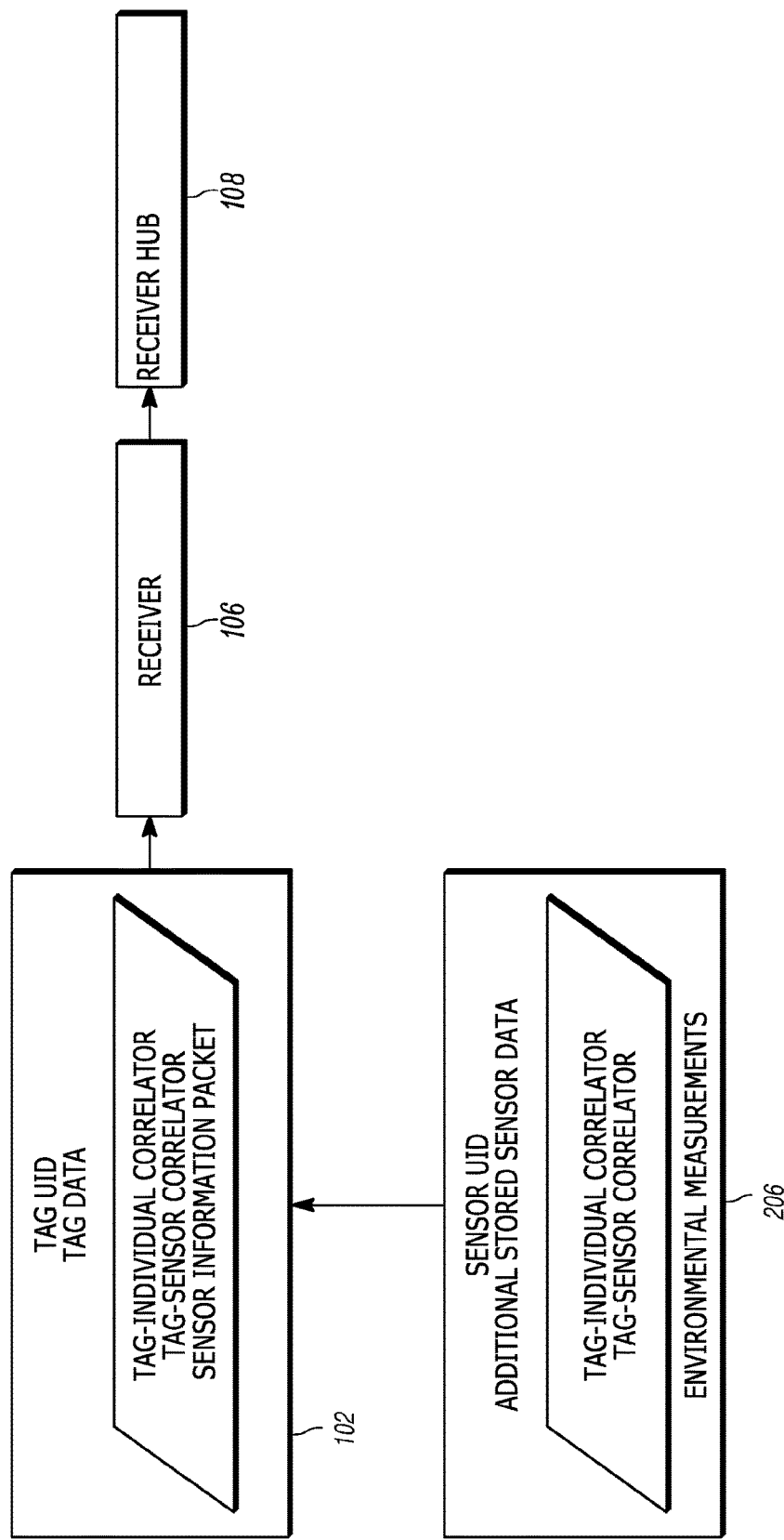

FIG. 3C depicts an example implementation of the sensor 206 that communicates through the RF location tag 102. In some examples, the sensor 206 is part of (i.e., reside in the same housing or assembly structure) of the RF location tag 102. In some examples, the sensor 206 is distinct from (i.e., not resident in the same housing or assembly structure) the RF location tag 102 but configured to communicate wirelessly or via wired communication with the RF location tag 102.

In some examples, the RF location tag 102, the sensor 206, or both, generates and/or stores a tag-sensor correlator (e.g., tag UID/sensor UID, distance from tag to sensor in a particular arrangement, set of sensors associated with a set of tags, sensor types associated with a tag, etc.) that indicates an association between the RF location tag 102 and the sensor 206. In the illustrated example, both the RF location tag 102 and the sensor 206 store the tag-sensor correlator.

In the illustrated example, the sensor 206 transmits a sensor signal to the RF location tag 102. The sensor signal includes one or more sensor information packets as discussed above. The sensor information packets include the sensor UID, a sensor-individual correlator, additional stored sensor data, the tag-sensor correlator, and/or the environmental measurements. In such instances, the RF location tag 102 stores some portion of, or all of, the sensor information packets locally and may package the sensor information packets into one or more tag data packets for transmission to the receiver 106 as part of a tag signal or simply pass them along as part of its tag signal.

Figure 3D:
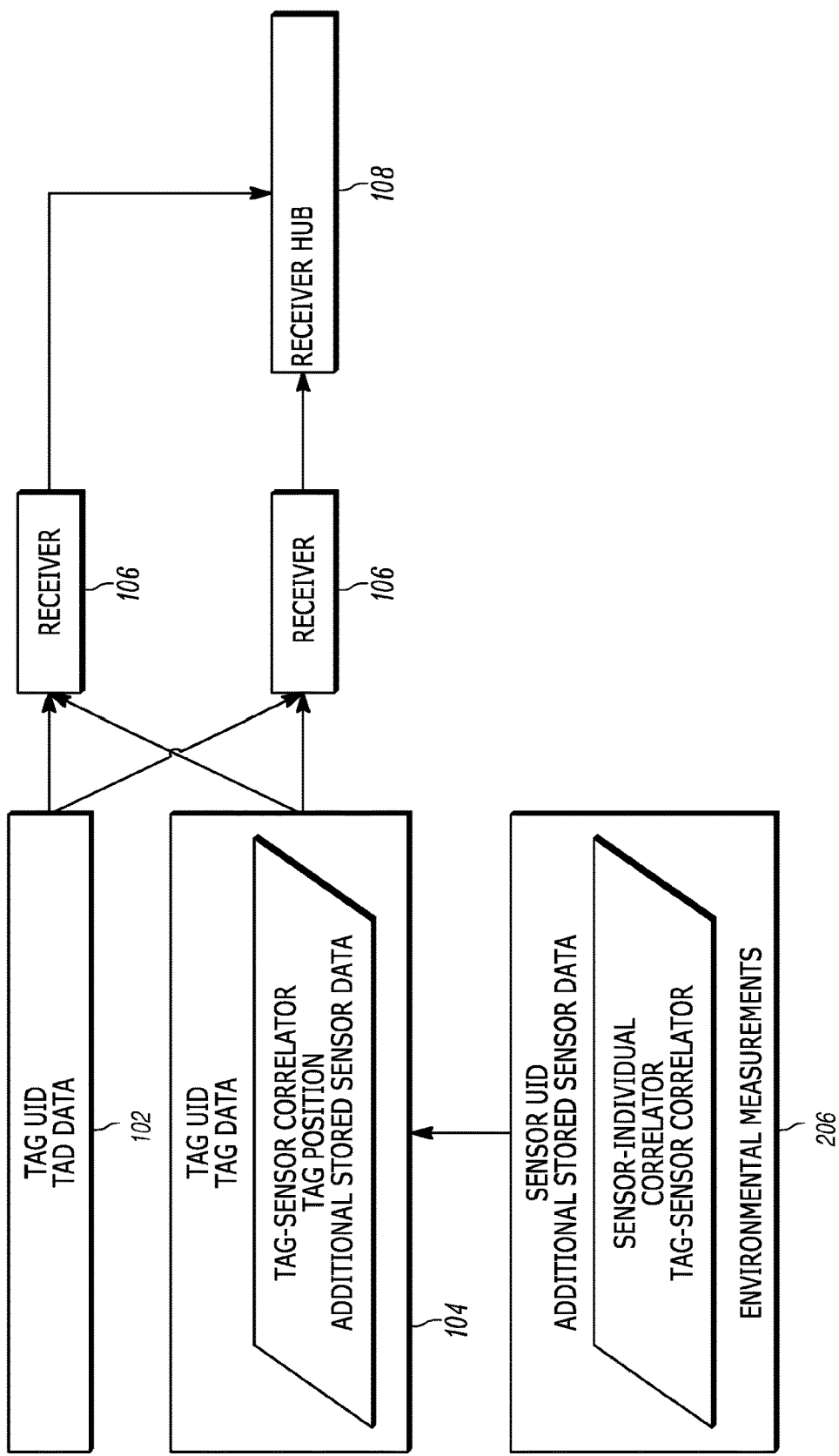

FIG. 3D illustrates an example communication structure for the reference tag 104 of FIG. 1, the RF location tag 102, the sensor 206, and two receivers 106 in accordance with some examples. The depicted reference tag 104 is a RF location tag and, thus, may include tag data, a tag UID, and is capable of transmitting tag data packets. In some examples, the reference tag 104 forms part of a sensor and, thus, may be capable of transmitting sensor information packets.

The depicted sensor 206 transmits a sensor signal to the reference tag 104. The reference tag 104 may store some portion or some or all of the sensor information packets locally and may package the sensor information packets into one or more tag data packets for transmission to the receivers 106 as part of a tag signal, or simply pass them along as part of the tag signal.

As was described above in connection with FIG. 1, the receivers 106 of FIG. 3D are configured to receive tag signals from the RF location tag 102 and the reference tag 104. Each of these tag signals may include blink data, which may comprise tag UIDs, tag data packets, and/or sensor information packets. The receivers 106 each transmit receiver signals via wired or wireless communication to the receiver hub 108.

Figure 3E:
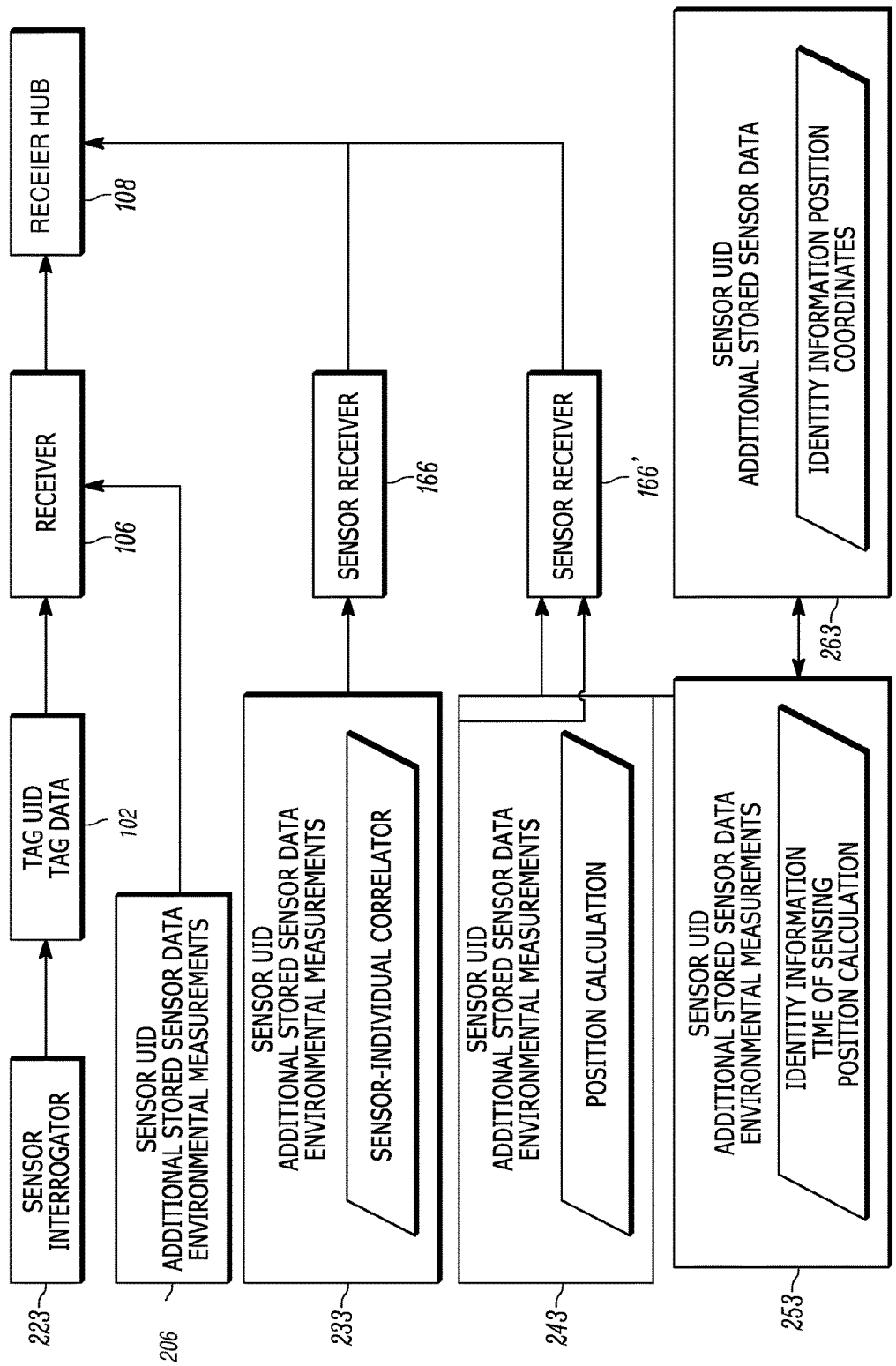

FIG. 3E illustrates an example communication structure between the RF location tag 102, the receivers 106, and a variety of sensor types including, without limitation, the sensor 206, a diagnostic device 233, a triangulation positioner 243, a proximity positioner 253, and a proximity label 263. In the illustrated example, none of the sensors 206, 233, 243, 253 form part of an RF location tag 102 or reference tag 104. However, each may comprise a sensor UID and additional stored sensor data. Each of the depicted sensors 206, 233, 243, 253 transmits sensor signals comprising sensor information packets.

In the depicted embodiment, the receiver 106 is configured to receive a tag signal from the RF location tag 102 and a sensor signal directly from the sensor 206. In some examples, the sensor 206 is configured to communicate in a communication protocol that is common to the RF location tag 202.

FIG. 3E depicts one type of sensor referred to herein as a "proximity interrogator". The proximity interrogator 223 can include circuitry operative to generate a magnetic, electromagnetic, or other field that is detectable by the RF location tag 102. While not shown in FIG. 3E, the proximity interrogator 223 may include a sensor UID and other tag and sensor derived data or information as discussed above.

In some examples, the proximity interrogator 223 is operative as a proximity communication device that can trigger the RF location tag 102 (e.g., when the RF location tag 102 detects the field produced by the proximity interrogator 223) to transmit blink data under an alternate blink pattern or blink rate. The RF location tag 102 can initiate a preprogrammed (and typically faster) blink rate to allow more location points for tracking an individual. In some examples, the RF location tag 102 does not transmit a tag signal until triggered by the proximity interrogator 223. In some examples, the RF location tag 102 is triggered when the RF location tag 102 moves near (e.g., within communication proximity to) a proximity interrogator 223. In some examples, the RF location tag 102 is triggered when the proximity interrogator 223 moves near to the RF location tag 102.

In some examples, the RF location tag 102 is triggered when a button is pressed or a switch is activated on the proximity interrogator 223 or on the RF location tag 102. For example, the proximity interrogator 223 could be placed at an entry point at the site 100 of FIG. 1. Every time a participant passes the entry point, the RF location tag 102 carried by the participant senses the signal from the proximity interrogator 223 and is triggered to transmit a tag signal indicating that the participant has entered a monitored area of the site 100. As another example, the proximity interrogator 223 is placed at feeding area at the site 100, which in this example is includes livestock. Each time a participant (e.g., cattle) visits the feeding area, the RF location tag 102 carried by the animal senses the signal from the proximity interrogator 223 and is triggered to transmit a tag signal indicating that the animal is in the feeding area.

FIG. 3E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 233 is not worn by an individual, the diagnostic device 233 may generate and store a sensor-individual correlator for association with environmental measurements taken in connection with a specific participant. For example, the diagnostic device 233 may be a blood pressure meter that is configured to store as environmental measurements blood pressure data for various individuals. Each set of environmental measurements (e.g., blood pressure data) may be stored and associated with a sensor-individual correlator.

The depicted diagnostic device 233 is configured to transmit a sensor signal including sensor information packets to a sensor receiver 166. The sensor information packets may comprise one or more of the sensor UID, the additional stored data, the environmental measurements, and/or the sensor-individual correlator as discussed above. The sensor receiver 166 associates some or all of the data from the sensor information packets with other stored data in the sensor receiver 166 or with data stored or received from other sensors, diagnostic devices, RF location tags 102, or reference tags 104. The sensor receiver 166 transmits a sensor receiver signal to the receiver hub 108 in the illustrated example.

Another type of sensor shown in FIG. 3E is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner (also known as a global positioning system (GPS) receiver) receives clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements.

In another embodiment, a triangulation positioner includes one or more cameras or image-analyzers that receive emitted or reflected light or heat, and then analyzes the received images to determine the location of an individual or sensor. Although a triangulation positioner may transmit data wirelessly, it is not a RF location tag because it does not transmit blink data or a tag signal that can be used by the receiver hub 108 to calculate location. In contrast, a triangulation positioner senses position and computes a position calculation that may then be used as environmental measurements by the receiver hub 108.

In one embodiment, a triangulation positioner could be combined with the RF location tag 102 or reference tag (not shown). In such embodiments, the triangulation positioner could compute and transmit its position calculation via the RF location tag 102 to one or more of the receivers 106. However, the receiver hub 108 calculates tag location based on the blink data received as part of the tag signal and not based solely on the position calculation. The position calculation would be considered as environmental measurements and may be included in associated sensor information packets.

Position calculations (e.g., GPS receiver position calculations) are not as accurate as the location calculations (e.g., UWB waveform based location calculations) performed by the receiver hub 108 structured in accordance with various embodiments of the disclosure. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E is a proximity detector 253. A "proximity detector" is a type of sensor that senses identity within an area (e.g., a local area) that is small with respect to the monitored area. Example methods of sensing identity (e.g., a unique ID or other identifier for a sensed object or individual) include reading a linear bar code, reading a two-dimensional bar code, reading a near field communication (NFC) tag, reading a RFID tag such as a UHF tag, HF tag, or low frequency tag, an optical character recognition device, a biometric scanner, or a facial recognition system.

In some examples, a proximity detector senses an attribute of an individual (or an individual's wristband, tag, label, card, badge, clothing, uniform, costume, phone, ticket, etc.). The identity sensed by the proximity detector 253 may be stored locally at the proximity detector 253 as shown and transmitted as environmental measurements via one or more sensor information packets to the sensor receiver 166.

In some examples, the proximity detector 253 has a defined position, which is often stationary, and may be associated with a fixed location in the monitored area (e.g., an entry point or feeding area). In examples in which the proximity detector 253 is stationary, the position coordinates of the proximity detector 253 and a sensor UID is stored to a monitored area database (not shown) that is accessible by one or more of the receivers 106, 166, the receiver hub 108, and/or other components of the receiver processing and distribution system 110. When the proximity detector 253 is movable, a position calculation could be determined with a triangulation positioner, or the proximity detector could be combined with the RF location tag 102 and located by the receiver hub 108. While shown as separate fields for illustration purposes in FIG. 3E, identify information and position calculation could comprise part of the additional stored sensor data, the environmental measurements, or both. In some examples, the proximity detector 253 is associated with the reference tag(s) 104, the position of which is recorded in the monitored area database.

In the embodiment in which the proximity detector 253 includes the RF location tag 102, the receiver hub 108 locates the associated RF location tag 102, and a tag data/sensor data filter associates the tag location data for the associated RF location tag 102 as the position of the proximity detector 253, while determining the identity of an associated participant from any received sensor information packets. In examples in which the proximity detector 253 includes a triangulation positioner, the triangulation positioner would compute a position calculation that could be stored as additional stored sensor data and/or environmental measurements, and transmitted as one or more sensor information packets. In one embodiment, sensor information packets for the proximity detector 253 include both sensed identity information and a position calculation.

Another type of sensor shown in FIG. 3E is a proximity label 263. A proximity label has a fixed position and an identification code (e.g., a sensor UID). The proximity label 263 may include additional stored sensor data as shown. The example proximity label 263 is configured to be read by the proximity detector 253. In some examples, the proximity detector 253 is configured to write information to the proximity label 263.

The proximity label 263 may be a sticker, card, tag, passive RFID tag, active RFID tag, NFC tag, ticket, metal plate, electronic display, electronic paper, inked surface, sundial, or otherwise visible or machine readable identification device. The coordinates of the position of the proximity label 263 are stored such that they are accessible to the receiver hub 108. For example, the position coordinates of the proximity label 263 could be stored in a field database or monitored area database accessible via a network, or stored locally as additional stored data in the proximity detector 253.

In some examples, a position of the proximity label 263 is encoded into the proximity label 263. For example, coordinates of a position of the proximity label 263 is encoded into a passive RFID tag that is placed in that position. In some examples, the coordinates of a position of the proximity label 263 is encoded into a printed barcode that is placed in that position. In some examples, the proximity label 263 includes a NFC tag encoded with the location "entry point", and the NFC tag could be placed at or near an entry point at the site 100. In some examples, the stored coordinates of the proximity label 263 are offset from the actual coordinates of the proximity label 263 by a known or determinable amount.

When a sensor such as the proximity detector 253 approaches the NFC tag, the proximity detector 253 reads the position, then transmits the position in a sensor information packet to the sensor receiver 166' and eventually to the receiver hub 108. In some examples, the proximity label 263 is a barcode label encoded with an identification code. When a smartphone with the proximity detector 253 (e.g., a barcode imager) and a triangulation positioner (such as a GPS chip, GPS application, or similar device) approaches the barcode label, the proximity detector 253 reads the identification code from the barcode, determines a position calculation from received clock data, then transmits the identity and the position calculation to the sensor receiver 166' and eventually to the receiver hub 108 as part of one or more sensor information packets.

In the illustrated example, the triangulation positioner 243 and the proximity detector 253 are each configured to transmit sensor signals carrying sensor information packets to the sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, I2C, etc.) may be used. Similarly, sensor receiver 166', and any receiver discussed herein, may use similar wired and wireless protocols to transmit receiver signals to the receiver hub/locate engine.

In some examples, upon receiving sensor signals from the triangulation positioner 243 and the proximity detector 253, the sensor receiver 166' associates some or all of the data from the received sensor information packets with other data stored to the sensor receiver 166', or with data stored or received from other sensors (e.g., the sensor 206), diagnostic devices 233, the RF location tags 102, or the reference tags 104. Such associated data is referred to herein as "associated sensor data". In the depicted embodiment, the sensor receiver 166' is configured to transmit some or all of the received sensor information packets and any associated sensor data to the receiver hub 108 at part of a sensor receiver signal.

In some examples, a smartphone including a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub 108. In some examples, the smartphone transmits a first sensor information packet including the identification code and the smartphone's unique identifier to another sensor receiver, the smartphone transmits a second sensor information packet including the position calculation and the smartphone's unique identifier to the sensor receiver, and the sensor receiver could associates the position calculation with the identification code based on the common smartphone unique identifier and transmits such associated sensor data to the receiver hub 108. In some examples, the sensor receiver could determine a first time measurement associated with the first sensor information packet and a second time measurement associated with the second sensor information packet that, in conjunction with the sensor UID, could be used, by the receiver hub 108, to associate the first sensor information packet with the second sensor information packet.

In the illustrated example, the receiver hub 108 receives receiver signals from the receiver 106 and sensor receiver signals from the sensor receivers 166, 166'. In the illustrated example, the receiver 106 receives blink data from the RF location tag 102 and transmits to the receiver hub 108 some or all of the blink data, perhaps with additional time measurements or signal measurements. In some embodiments, time measurements or signal measurements may be based on a tag signal received from the RF reference tag(s) 104. The example receiver hub 108 collects the blink data, time measurements (e.g. time of arrival, time difference of arrival, phase), and/or signal measurements (e. g. signal strength, signal direction, signal polarization, signal phase) from the receivers 106 and computes tag location data for the RF location tags 102 as discussed above in connection with FIG. 1. In some examples, the receivers 106 are configured with appropriate RF filters, such as to filter out potentially interfering signals or reflections at the site 100.

The receiver hub 108 may also access stored data or clock data from local storage and from a network location. The receiver hub 108 uses this information to determine tag location data for each of the RF location tags 102. Additionally, the example receiver hub 108 associates data derived or extracted from tag signals transmitted from one or more of the RF location tags 102 with information or data derived or extracted from sensor signals transmitted from one or more sensors 206.

In addition to the TOA or TDOA systems previously described, other RTLSs such as received signal strength indication based systems could potentially be implemented by the receiver hub 108. Any RTLS system using RF location tags, including those described herein could require considerable processing by the receiver hub 108 to determine the tag location data from the blink data received from the RF location tags 102. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 3C, the depicted RF location tag 102 is used to convey (sometimes called backhaul) sensor information packets to the receiver 106. In some examples, while not shown, multiple sensors 206 may transmit sensor signals carrying sensor information packets to the RF location tag 102. Such received sensor information packets may be associated with blink data that is transmitted to the receiver 106.

In some examples, the receiver hub 108 parses sensor information packets from received tag data packets and associate such sensor information packets with the RF location tag 102 that transmitted the sensor information packet. Thus, the receiver hub 108 is able to determine tag location data, which may comprise a location and other data (e.g., tag data, tag UID, tag-individual correlator, sensor-individual correlator, additional stored sensor data, environmental measurements, tag-sensor correlator, identity information, position calculation, etc.) from one or more RF location tags 102 or sensors 206. Such data and information may be transmitted to the receiver processing and distribution 110.

In some examples, once the receiver hub 108 determines a location estimate of a RF location tag 102 at the time epoch of the corresponding tag signal, the receiver hub 108 associates a location estimate with the tag data packet included in the blink data of such tag signal. In some examples, the location estimate of the tag signal may be used as tag location data for the tag data packet. In some examples, a Geographical Information System (GIS) may be used by the receiver hub 108 to refine a location estimate, or to map a location estimate in one coordinate system to a location estimate in a different coordinate system, to provide a location estimate for the tag data packet.

In some examples, the location estimated for the tag data packet is associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub 108 parses the position calculation and use it to refine a location estimate for the tag data packet.

Preferably, the receiver hub 108 accesses an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some examples, by comparing data accessed using a sensor-individual correlator, the receiver hub 108 associates a participant with a sensor information packet received from a sensor, and/or may associate a participant with such sensor. Because the receiver hub 108 associates a sensor position estimate with a sensor information packet, the receiver hub 108 estimates an individual position for the associated participant.

In some examples, by comparing data accessed using a tag-sensor correlator, the receiver hub 108 associates a sensor with a tag data packet received from the RF location tag 102. Because the receiver hub 108 associates a location estimate with a tag data packet, the receiver hub 108 creates a sensor location estimate for the associated sensor. By comparing a location estimate for the RF location tag 102 with a sensor location estimate or a sensor position estimate, the receiver hub 108 may associate the RF location tag 102 with a sensor, or may associate a tag data packet with a sensor information packet. The receiver hub 108 could also determine a new or refined tag-sensor correlator based on this association.

In some examples, by comparing a location estimate for the RF location tag 102 with an individual location estimate or an individual position estimate, the receiver hub 108 associates a RF location tag with a participant, or may associate a tag data packet with a participant. The receiver hub 108 could determine a new or refined tag-individual correlator based on this association.

In some examples, by comparing a location estimate for the sensor 206 with an individual location estimate or an individual position estimate, the receiver hub 108 may associate a sensor with an individual, or may associate a sensor information packet with an individual. In some examples, the receiver hub 108 determines a new or refined sensor-individual correlator based on this association.

Data derived or extracted from tag signals transmitted from one or more of RF location tags (e.g., the RF location tags 102 of FIG. 1) is referred to herein as "tag derived data"

and shall include, without limitation, tag data, tag UID, tag-individual correlator, tag-sensor correlator, tag data packets, blink data, time measurements (e.g. time of arrival, time difference of arrival, phase), signal measurements (e.g., signal strength, signal direction, signal polarization, signal phase) and tag location data (e.g., including tag location estimates). Tag derived data is not derived by the RF location tag 102, but rather, is derived from information transmitted by the RF location tag 102. Information or data derived or extracted from sensor signals transmitted from one or more sensors (e.g., the sensor 206 of FIG. 2A) is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data. Data derived or extracted from stored individual data is referred to herein as "individual profile information", "participant profile information", or simply "profile information" and shall include, without limitation tag-individual correlator, sensor-individual correlator, identity information, name, group number assigned to a group of which the participant is a member, biometric data, tag position on individual. In some examples, the receiver hub 108 transmits tag derived data, sensor derived data, individual profile information, various combinations thereof, and/or any information from the GIS, and/or one or more databases to the receiver processing and distribution system 110.

In some examples, the receiver hub 108 outputs data packets to a filter and analytics engine and/or to a support and diagnostics engine. The receiver hub 108 may output tag location data or "T-packets", in an instance in which a tag location has been calculated from the tag blink data. In some examples, the receiver hub 108 outputs a tag derived data, "P-packets", in an instance in which the receiver hub 108 has received tag blink data, but a location calculation was not possible (e.g., in an instance in which tag blink data is received by less than a predetermined number of the receivers 106). The tag derived P-packet may include the tag UID, but no location data. The receiver hub 108 may output a tag derived data, D-packet, in an instance in which a diagnostic error code is included in the packet. The diagnostic error code may be derived from the blink data or may be generated by one or more of the receivers 106 and/or the receiver hub 108.

In some embodiments, the filter and analytics engine generates multidimensional (e.g., a two-dimensional location, a three-dimensional location or the like) participant location data per unit time of each tag. The filter and analytics engine may receive tag location data packets (T-packets) from the receiver hub 108. The filter and analytics engine may parse the tag location data by data fields and map the locations data for each tag generating multidimensional participant location data per unit time.

Alternatively or additionally, the filter and analytics engine may apply various filters to the generated multidimensional participant location data per unit time including without limitation, dismissing compromised accuracy tag events, missed tag event blink adjustments, pop tag event blink adjustments, tag-tag offset, output to a television broadcast, or the like. The filter and analytics engine may cause raw or filtered data files to be stored in a local data storage or data storage of a data center. The filter and analytics engine may output the multidimensional participant location data per unit time to a visualization and model engine.

System Health Monitor

FIG. 4 is a block diagram representative of an example environment in which the example health monitor 112 of FIG. 1 may be implemented. The example of FIG. 4 includes a plurality of sites 400-406. One or more of the sites 400-406 is configured in a similar manner as the example site 100 of FIG. 1. In the illustrated example of FIG. 4, a locating system, such as the locating system described above in connection with FIGS. 1, 2 and 3A-3D is installed at each of the sites 400-406. As described above, the locating system of a site locates tags (e.g., the RF tags 102 of FIG. 1) carried by participants at that site. The tags transmit blink data that is received at receivers (e.g., the receivers 106 of FIG. 1) deployed at the site. The receivers communicate the blink data and related timing data to a receiver hub (e.g., the receiver hub 108 of FIG. 1). The receiver hub 108 uses the blink data and timing information received from multiple ones of the receivers to generate a "locate," which represents a location estimation of the tag and, thus, the participant carrying the tag. As described above, in some instances, the locate generated by the hub is referred to as a T-packet. With this configuration and architecture, the quality (e.g., reliability) of location information generated by the locating system is dependent on the performance and/or status of, among other components, the tags, the receivers, and the hub.

In the illustrated example, the locating system of each one of the sites 400-406 is managed by a system management entity (or entities) associated with the locating systems. The example health monitor 112 of FIG. 4 is constructed in accordance with teachings of this disclosure to provide the system management entity with data indicative of the performance and/or status of the locating systems and components (e.g., the receivers 106) of the locating systems at the sites 400-406. The data indicative of the performance and/or status of the locating systems is referred to herein as site health information. For example, the health monitor 112 of FIG. 4 enables the system management entity to view site health information associated with the individual sites 400-406 on a single graphical user interface (GUI). In some examples, site health information associated with site A 400 is generated and displayed on the GUI and system health information associated with the other sites 402-406 are generated and displayed on the GUI simultaneously. As such, the example health monitor 112 of FIG. 4 provides system health information such that the entity can readily evaluate the individual sites 400-406 and the collection of the individual sites 400-406 as a whole. Further, the example health monitor 112 of FIG. 4 enables a readily available comparison of the performance and/or status of the individual sites 400-406.

Quantifying and identifying the health of each individual site and/or individual components at the respective sites is beneficial to provide service when, for example, one or more issues arise at one or more of the sites 400-406. The example health monitor 112 of FIG. 4 provides useful metrics representative of site health, as well as visual representations of site health (e.g., current and/or historical performance information), which is useful in servicing and maintaining the locating systems installed at the sites 400-406. For example, the health monitor 112 of FIG. 4 provides specific data related to hardware (e.g., sensors, receivers, hubs, etc.) and software applications. In the illustrated example, the health monitor 112 of FIG. 4 generates and/or displays the site health information statically, dynamically (e.g., in real time), and/or in a combination of static and dynamic operations. In some examples, the health monitor 112 provides one or more indications of a relationship between current metric values and one or more critical thresholds. Additionally, the health monitor 112 provides alerts when, for example, a critical threshold has been reached. Entities are made aware of the corresponding issue quickly and, thus, can address the issue quickly. Example visualizations of the site health information generated by the example health monitor 112 are described below in connection with FIGS. 6-12.

Figure 5:
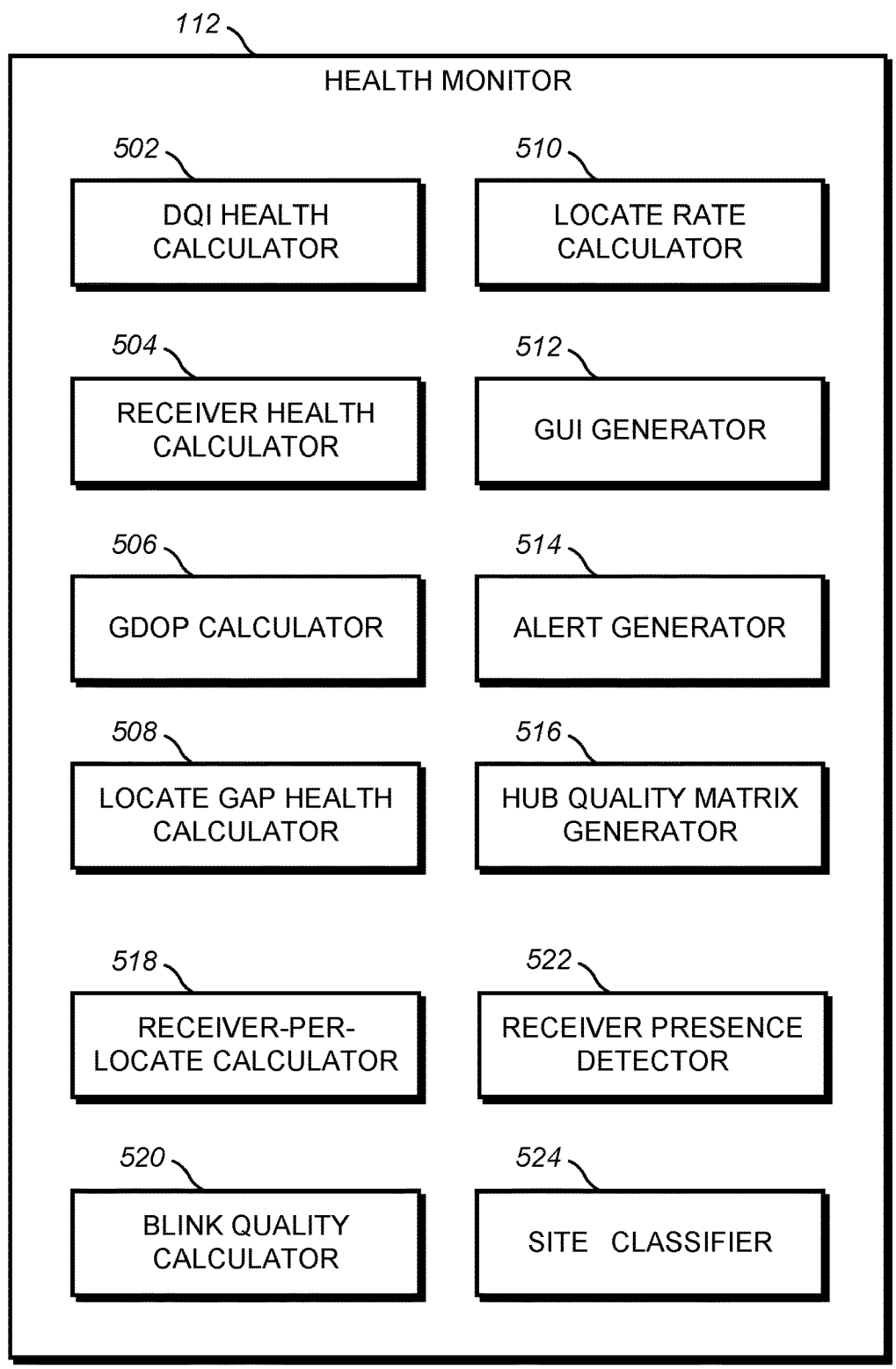
FIG. 5 is a block diagram representative of an example implementation of the example health monitor of FIGS. 1 and 4.

FIG. 5 is a block diagram representative of an example implementation of the example health monitor 112 of FIGS. 1 and/or 4. The example health monitor 112 of FIG. 5 includes a data quality indicator (DQI) health calculator 502, a receiver health calculator 504, a geometric dilution of precision (GDOP) calculator 506, a locate gap health calculator 508, a locate rate calculator 510, a GUI generator 512, an alert generator 514 and a hub quality matrix generator 516. As described in detail below, the example hub quality matrix generator 516 uses metric values generated by the DQI health calculator 502, the receiver health calculator 504, the GDOP calculator 506, the locate gap health calculator 508, and/or the locate rate calculator 510 to generate a hub quality matrix representative of performance and/or status of a hub (e.g., the receiver hub 108) or any other component tasked with generating location estimates (i.e., locates) based on blink data received from RF location tags. The hub quality matrix and the metrics on which the hub quality matrix is based are described in detail below in connection with FIGS. 6-11.

Additionally, the example health monitor 112 of FIG. 5 includes a receiver-per-locate calculator 518, a blink quality calculator 520, a receiver detector 522, and a site classifier 524. As described in detail below, the example site classifier 524 uses metric values generated by the receiver-per locate calculator 518, the blink quality calculator 520, and/or the receiver detector 522 to assign a classification to each of the sites providing data to the health monitor 112.

The example health monitor 112 of FIG. 5 obtains data associated with each of the sites 400-406 from, for example, the hub 108 of the respective sites 400-406 that is in communication (e.g., via a network and/or directly) with the health monitor 112 and/or from one or more data storage units that receive data from the sites 400-406. The example health monitor 112 of FIG. 5 can obtain input data via additional or alternative sources.

FIGS. 6-11 are screenshots of example portions of an example GUI generated by the example GUI generator 512 based on data generated by the example DQI health calculator 502, the example receiver health calculator 504, the example GDOP calculator 506, the example locate gap health calculator 508, the example locate rate calculator 510 and the hub quality matrix generator 516 of FIG. 5. While the example health monitor 112 of FIG. 5 is described below in connection with the example screenshots of FIGS. 6-11, the example health monitor 112 of FIG. 5 can be implemented in connection with additional or alternative GUIs and/or without a GUI.

Figure 6:
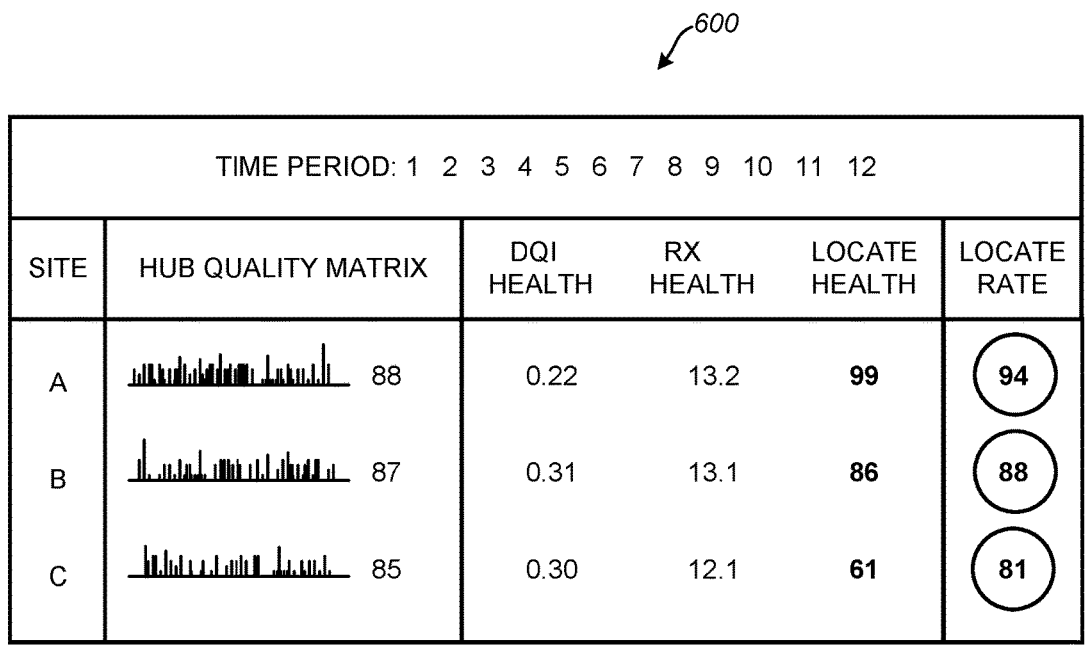
FIG. 6 depicts an example main screen of a user interface associated with the example health monitor of FIGS. 1, 4 and 5.

FIG. 6 shows a main screen 600 of the example GUI generated by the example GUI generator 512 of FIG. 5. The example main screen 600 of FIG. 6 includes fields for different sites 400-404 of, for example, the environment of FIG. 4. For each of the sites A-C 400-404, the main screen 600 of FIG. 6 includes a value for a hub quality matrix calculated by the example hub quality matrix calculator 516, a value for DQI health calculated by the example DQI health calculator 502, a value for receiver health calculated by the example receiver health calculator 504, a value for locate gap health calculated by the example locate gap health calculator 506, and a value for locate rate calculated by the example locate rate calculator 510. Generation of the values displayed on the example main screen 600 of FIG. 6 is described in detail below.

In some examples, one or more of the values is displayed using a first color when the value is considered problematic, a second color when the value is considered concerning but within constraints, or a third color when the value is indicative of satisfactory. Additional or alternative types of visual and/or audio distinctions are possible. The example alert generator 514 of FIG. 5 generates alerts when one or more of the values indicated on the main screen 600 of FIG. 6 meets or exceeds an alert threshold (e.g., a value associated with an undesirable performance metric). In some examples, the alert generator 514 of FIG. 5 causes an alert to be displayed on the GUI. Additionally or alternatively, the example alert generator 514 sends an alert to, for example, one or more designated persons (e.g., as addressable by a number and/or address), devices, and/or accounts.

In the example main screen 600 of FIG. 6, the numeric value of the hub quality matrix is listed proximate a graphic including a plurality of lines. In the illustrated example, the graphic corresponds to a number of bins (e.g., events, groups of events, etc.) that fail to meet one or more criteria and/or a number of bins that meet the one or more criteria. The numeric value of the hub quality matrix is an overall indicator of the quality of location information being generated by the corresponding locating system installed at the corresponding site. In the illustrated example, the hub quality matrix generator 516 generates the hub quality matrix for a selected period of time or a current period of time by combining at least two of the value of the DQI health metric for the selected/current period of time, the value of the receiver health metric for the selected/current period of time, the value of the locate gap health metric for the selected/current period of time, and the value of the locate rate metric for the selected/current period of time. For example, the hub quality matrix generator 516 of FIG. 5 calculates a weighted sum of those values. The example hub quality matrix generator 516 of FIG. 5 may utilize additional or alternative combinations and/or algorithms that consider the different values for generating the value of the hub quality matrix (HQM). In the illustrated example, the hub quality matrix generator 516 calculates the following, where a, b, c, and d are constants selected according to, for example, one or more factors and/or criteria that may differ from one site to another site:

$$HQM = a[\text{DQI health}] + b[\text{receiver health}] + c[\text{locate gap health}] + d[\text{locate rate}]$$

Figure 7:
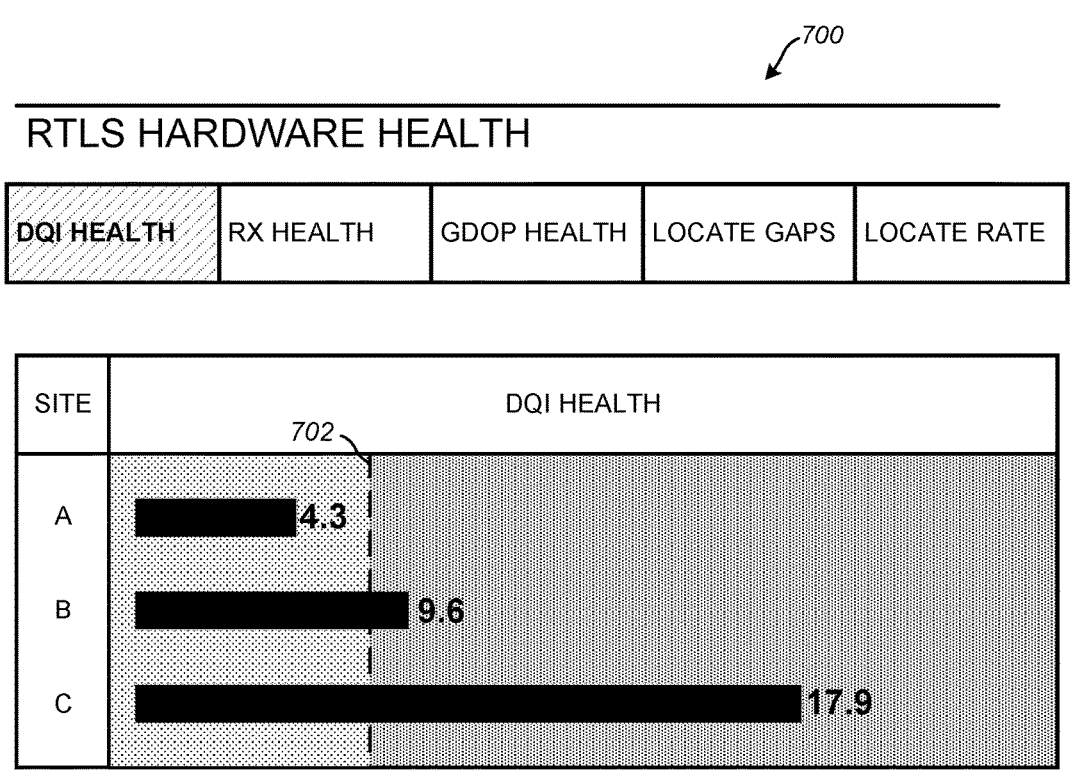
FIG. 7 depicts an example data quality indicator (DQI) health screen of a user interface associated with the example health monitor of FIGS. 1, 4 and 5.

FIG. 7 shows a screenshot of an example DQI health screen 700 of the example GUI generated by the GUI generator 512 of FIG. 5. The DQI health metric has a value that represents how close an estimated location (e.g., generated by the hub 108 of FIG. 1) is to, for example, a minimization function, as described above, associated with the locating system. Put another way, the DQI health metric is indicative of a confidence in a location estimation based on a degree to which the TOAs agree with each other (e.g., have similar values) for a particular iteration. Identifying a poor DQI indicates, for example, an incorrect hardware configuration parameter, an incorrect survey measurement and/or reflected data paths instead of direct data. In the illustrated example, the DQI health calculator 502 calculates the value of the DQI health metric by calculating the following:

DQI Health=(number of bins<dqiThreshold)/total
number of bins

In the illustrated example, the DQI health calculator 502 calculates a value for the DQI metric according to the following for each iteration:

$$DQI = \frac{1}{N}\sum (d_i - c(t_i - t_0))^2$$

In the above equation, N is a total number of receivers (e.g., the receivers 106) of FIG. 1 involved in the current iteration of a location estimation, $d_i$ is a distance from the receiver to the estimated location, c is the speed of light, $t_i$ is time of detection of blink data, and $t_0$ is an estimated time of transmission of the blink data. Here, the estimated time of transmission is calculated by determining a difference between an average detection time (of the blink data) for all of the receivers and a time to the estimated location.

For the above example, the DQI health calculator 502 determines a number of bins (e.g., periods of time or events) having a DQI that falls below a defined threshold (dqiThreshold). The threshold is defined or customized based on, for example, a particular aspect such as the corresponding site, a period of time or time of day, desires or goals specific to a type of task, etc. In the illustrated example, the threshold can be varied to adjust the sensitivity of the metric to account for varying conditions or characteristics of a current scenario, application, and/or implementation. Further, for the above example, the DQI health calculator 502 divides that number of bins by the total number of bins. As such, the example DQI health calculator 502 determines a percentage of bins having less than (or greater than) the threshold DQI health, where the threshold DQI is selected to reflect a dividing line between, for example, satisfactory and unsatisfactory health.

The example GUI generator 512 generates a display that plots the individual DQI health information for the individual sites 400-404 in proximity with each other. In the illustrated example of FIG. 7, the values are represented in a bar graph with the corresponding numeric values displayed adjacent the corresponding bar. The example bars of FIG. 7 are sorted in increasing order. However, any suitable arrangement is possible. In the illustrated example of FIG. 7, a predetermined threshold is represented by a line 702 that divides the graphic into a satisfactory region and an unsatisfactory region. In some instances, the different regions of the graphic are colored differently.

Figure 8:
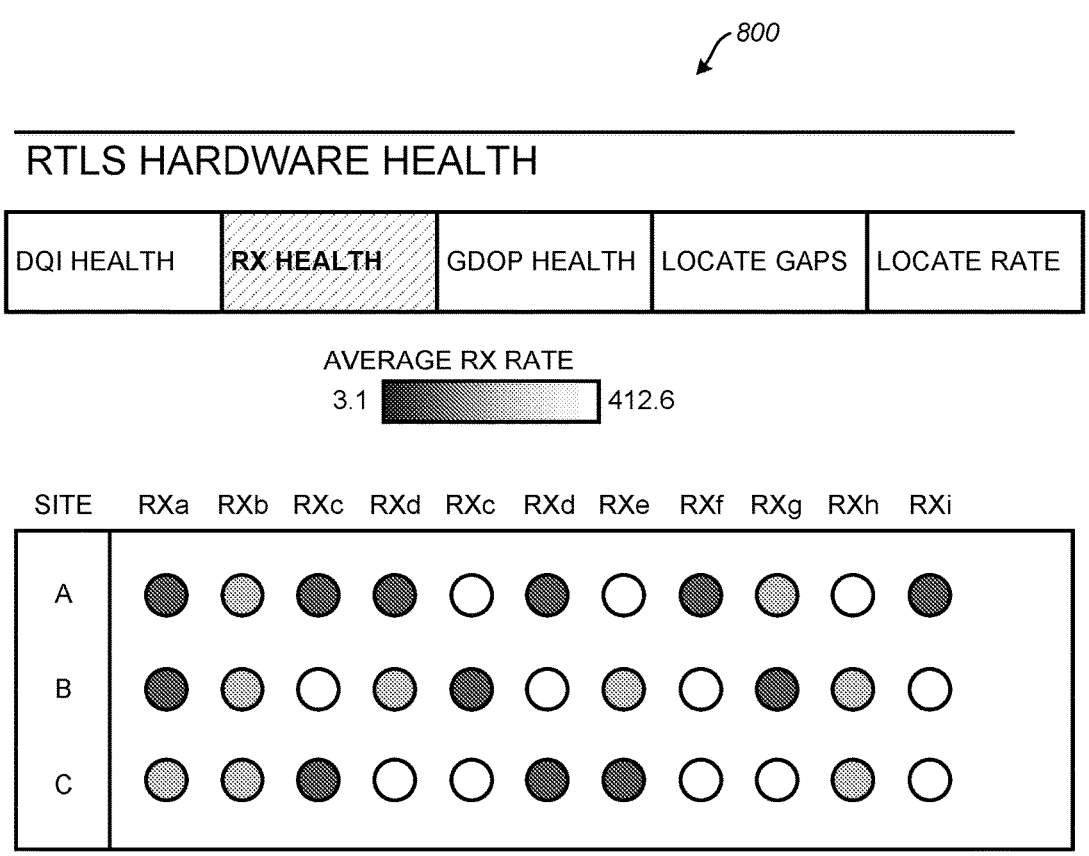
FIG. 8 depicts an example receiver health screen of a user interface associated with the example health monitor of FIGS. 1, 4 and 5.

FIG. 8 shows a screenshot of an example receiver health screen 800 of the example GUI generated by the example GUI generator 512 of FIG. 5. The receiver health metric has a value that represents the receive rate for different receivers at the sites. Identifying poor receiver health indicates, for example, environmental issues and/or antenna placement issues. The example receiver health calculator 504 of FIG. 5 determines or obtains a receive rate for the individual receivers for particular bins (e.g., periods of time such as periods or events). For example, the receiver health calculator 504 determines a rate at which the receivers receive blink data for the period of time. For each receiver, the example receiver health screen 800 of FIG. 8 includes a colored dot indicative of the overall (e.g., over a period of time) receive rate for the corresponding receiver (e.g., RXa, RXb, etc.). In the illustrated example of FIG. 8, the color of the dot is determined according to a scale (e.g., a heat map scale). For example, if the receive rate for a particular receiver falls below a threshold value of the scale, the corresponding dot is tinted red, with darker reds appearing for lower receive rates. Conversely, if the receive rate for a particular receiver is above the threshold value of the scale, the corresponding dot is tinted green, with darker greens appearing for greater receive rates. An intensity of the color may be based on a gradient associated with the scale.

The example receiver health calculator 504 of FIG. 5 determines an overall receiver health value for the individual sites 400-404 and that overall value is presented on the example main screen 600 of FIG. 6. To calculate the overall receiver health value, the example receiver health calculator 504 of FIG. 5 determines the following:

$$\sum_{for\,all\,Rx1}^{n} \frac{\#Rx(\text{bins} > rxRateThreshold)}{\text{total } \#Rx}$$

As such, for the plurality of receivers at a particular site, the example receiver health calculator 504 of FIG. 5 determines an overall receiver health of the site based on a number of bins (e.g., periods of time or events) that exceeded a defined receive rate threshold. The threshold is defined or customized based on, for example, a particular aspect such as the corresponding site, a period of time or time of day, desires or goals specific to a type of task, etc. In the illustrated example, the threshold can be varied to adjust the sensitivity of the metric to account for varying conditions or characteristics of a current scenario, application, and/or implementation.

Figure 9:
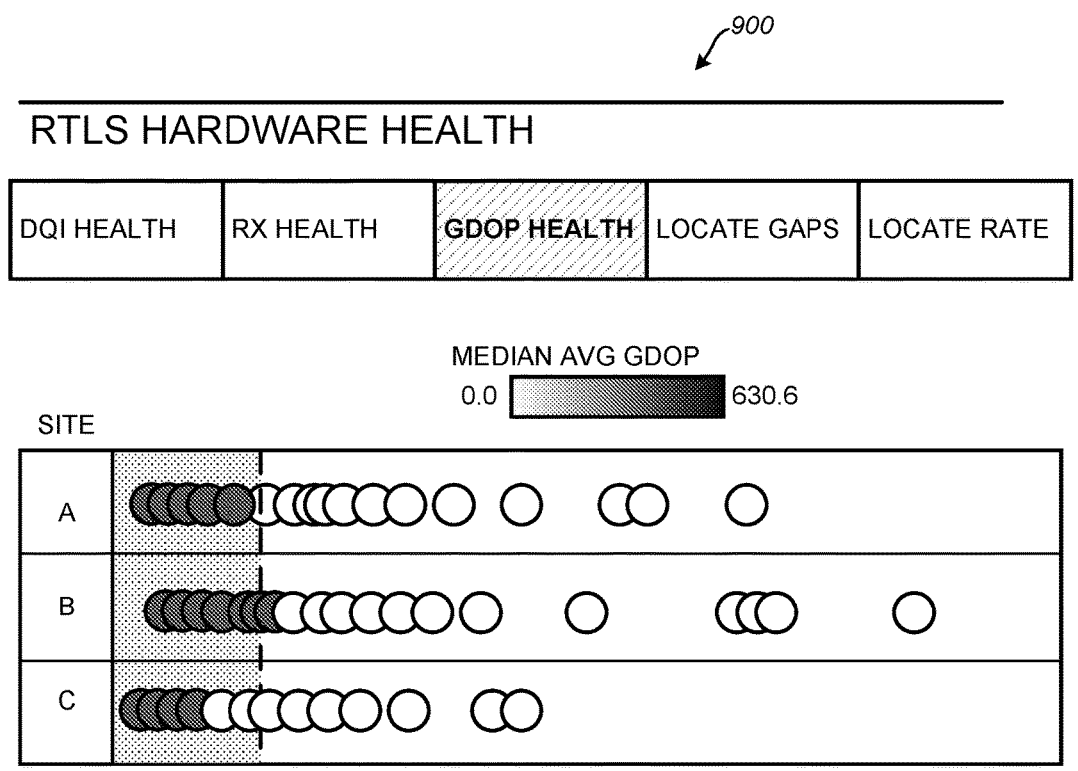
FIG. 9 depicts an example geometric dilution of precision (GDOP) health screen of a user interface associated with the example health monitor of FIGS. 1, 4 and 5.

FIG. 9 shows a screenshot of an example GDOP health screen 900 of the example GUI generated by the example GUI generator 512 of FIG. 5. The GDOP health calculator 506 of FIG. 5 determines the following to measure the GDOP health of a particular site:

GDOP Health=(number of bins>gdopThreshold)/total
number of bins)

As such, the example GDOP calculator 506 of FIG. 5 determines a GDOP health based on a number of bins (e.g., periods of time or events) that exceeded a defined GDOP threshold. The threshold is defined or customized based on, for example, a particular aspect such as the corresponding site, a period of time or time of day, desires or goals specific to a type of task, etc. In the illustrated example, the threshold can be varied to adjust the sensitivity of the metric to account for varying conditions or characteristics of a current scenario, application, and/or implementation. In some examples, a value of this calculation may be displayed in the example main screen 600 of FIG. 6. Further, the example GDOP health screen 900 of FIG. 9 includes a graphical representation of the GDOP values associated with each individual bin. In the illustrated example of FIG. 9, the graphical representation (e.g., circle) is colored and/or sized in a first manner for high GDOP health indications and in a second manner for low GDOP health indications. For example, a varying intensity of a first color may be displayed when the GDOP value is below a threshold and a varying intensity of a second color may be displayed when the GDOP value is above the threshold.

In the illustrated example, the GDOP health calculator 504 determines a geographic distribution of the receivers to determine GDOP value. When the receivers surround the RF location tag(s) being used for a location estimation, the GDOP is better (e.g., higher confidence level) than, for example, the receivers all being on one side of the RF location tag.

Figure 10:
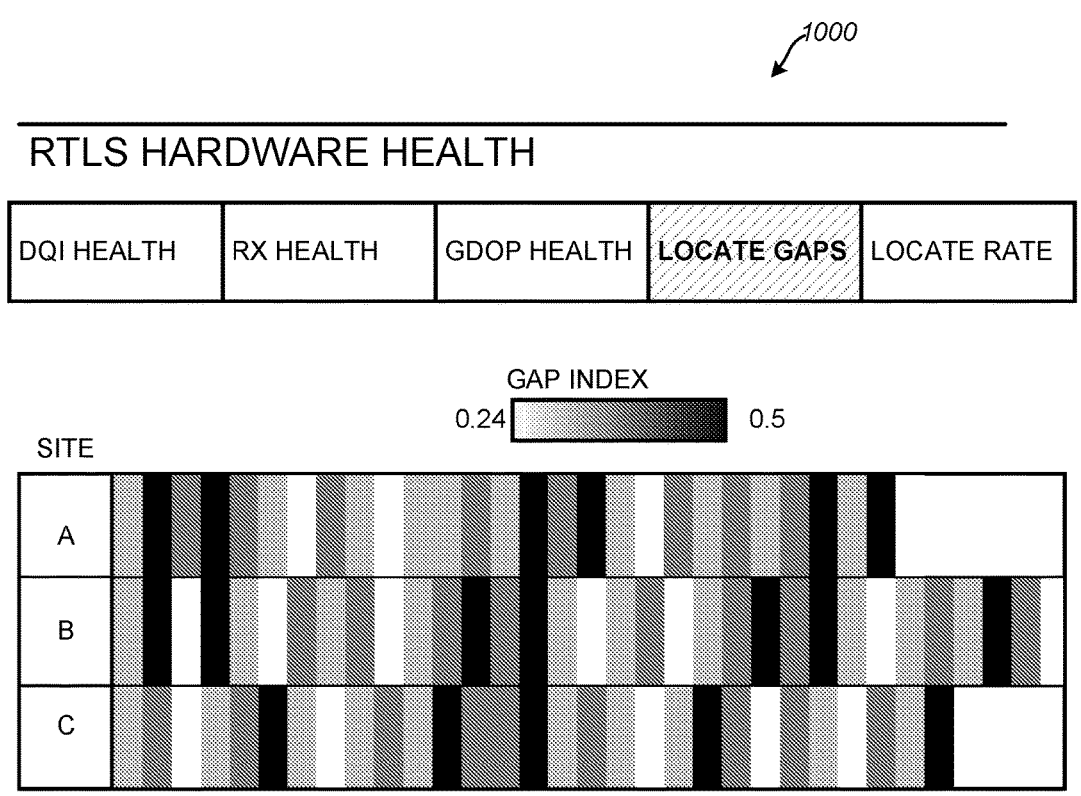
FIG. 10 depicts an example locate gaps screen of a user interface associated with the example health monitor of FIGS. 1, 4 and 5.

FIG. 10 shows a screen shot of an example locate gap health screen 1000 of the example GUI generated by the example GUI generator 512 of FIG. 5. The locate gap corresponds to an amount of time (e.g., a gap) between location estimations (i.e., locates) generated by, for example, the receiver hub. The example locate gap calculator 508 of FIG. 5 determines the following locate gap value for individual bins (e.g., periods of time or events):

Locate gap=$a$[# of gaps<0.2 s]+$b$[# of gaps<0.5 s]+$c$[# of gaps>0.5 s].

That is, for individual bins (e.g., periods of time or events), the example locate gap calculator 508 of FIG. 5 calculates a weighted sum of a number of gaps less than 0.2 seconds, a number of gaps less than 0.5 seconds, and a number of gaps greater than or equal to 0.5 seconds. While 0.2 seconds and 0.5 second are used in the above example, any suitable threshold(s) can be used. FIG. 10 is a graphical representation of the locate gaps at the individual sites. The components of the lines in FIG. 10 are colored according to a scale indicative of whether the locate gap meets a threshold or criteria. For example, a first color may be displayed when the threshold or criteria is met and a second color may be displayed when the threshold of criteria is not met. Additionally, the intensity of the color may depend on how close the value is to the threshold or criteria. In the illustrated example of FIG. 10, each colored segment for a particular site corresponds to a locate gap calculation for a specific bin.

The locate gap health for the particular site is displayed on the example main screen 600 of FIG. 6. The example locate gap calculator 508 of FIG. 5 determines a locate gap health for an overall health of a particular site according to the following:

Locate gap health=(number of bins<LocateGapThreshold)/total number of bins

Figure 11:
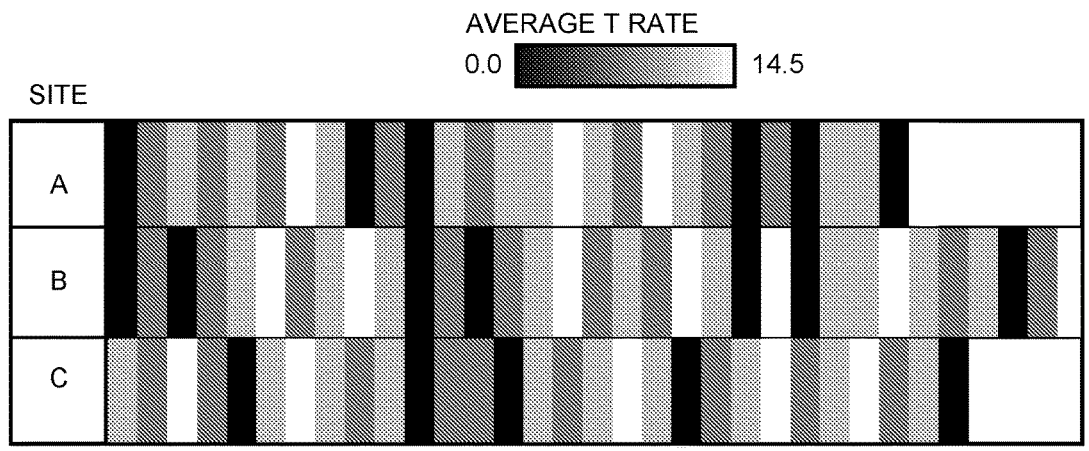
FIG. 11 depicts an example locate rate screen of a user interface associated with the example health monitor of FIGS. 1, 4 and 5.

FIG. 11 shows a screenshot of an example locate rate health screen 1100 of the example GUI generated by the example GUI generator 512 of FIG. 5. The locate rate is indicative of, for example, a rate at which locate data (e.g., T packets) is generated (e.g., by the receiver hub 108). Identifying poor locate rate indicates, for example, poor tag placement for the participants being tracked. The example locate rate calculator 510 of FIG. 5 determines the following:

$$\text{Locate rate} = \frac{\text{total } Tcount}{\text{total assets tracked}} * tagRate(\text{Hz})$$

The Tcount is indicative of an amount of locates (e.g., a number of T-packets) received. The example of FIG. 11 includes color coded components based on whether the corresponding locate rate meet or does not meet a threshold or criteria for a corresponding bin. Additionally, the intensity of the color may depend on how close the value is to the threshold or criteria.

The example locate rate calculator 510 of FIG. 5 generates a locate rate health based on the locate rate. To calculate the locate rate health for a site, the example locate rate calculator 510 of FIG. 5 determines the following:

Locate Rate Health=(number of bins>locateRateThreshold)/total number of bins

In the illustrated example, the locate rate health is displayed on the example main screen 600 of the GUI generated by the example GUI generator 512 of FIG. 5.

As described above, the HQM, which serves as an overall indicator of the health of the corresponding site and the locating system, is based on two or more of the values of the DQI health metric, the receiver health metric, the locate gap health metric, and the locate rate health metric. With the HQM values provided by the example health monitor 112, the system management entity can better manage and maintain the different locating systems of the sites.

Figure 12:
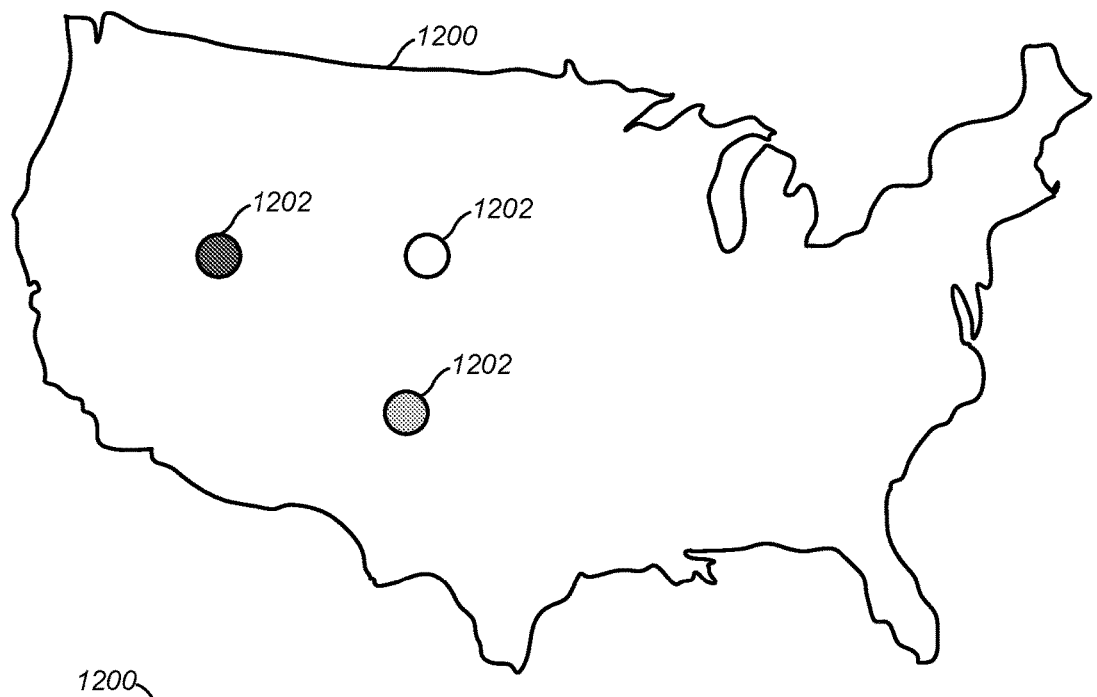
FIG. 12 depicts an example overview screen of a user interface associated with the example health monitor of FIGS. 1, 4 and/or 5.

FIG. 12 depicts another GUI element generated by the example GUI generator 512 of FIG. 5. The example GUI element of FIG. 12 includes a map 1200 having site health indicators 1202 of the health of different sites (e.g., the sites 400-406 of FIG. 4). The value of the site health indicators, which may be communicated on the example map 1200 via colors of varying intensity (e.g., a heat map scheme), is based on data generated by the example health monitor 112 of FIG. 5. In the illustrated example, the value of the site health indicators 1202 is based on a combination of data indicative of a number of receivers-per-locate, data indicative of blink quality, and data indicative of missing receivers.

In the illustrated example, the health monitor 112 includes a receiver-per-locate calculator 518 to determine a number of receivers at a site that contributed to each locate generated by the locating system. As described above, the receivers (e.g., the receivers 106 of FIG. 1) receive blink data from the RF location tag (e.g., the tags 102 of FIG. 1) and the location data is derived (e.g., by the receiver hub 108) from the blink data. That is, the location data is generated based on data provided by a plurality of receivers. In some instances, data associated with one or more of the receivers at a particular time is discarded (e.g., due to a lack of reliability of the data) or the data is not received from one or more of the receivers. Accordingly, the location data generated by the locating system is sometimes based on a subset of the receivers.

The example receiver-per-locate calculator 518 of FIG. 5 determines a number of the receivers that contributed to each location determination. In the illustrated example, the receiver-per-locate calculator 518 aggregates this number for a period of time (e.g., a day) and provides, for example, an average number of receivers that contribute to each location determination. The example GUI generator 512 of FIG. 5 populates a table 1204 with the aggregated information.

The example health monitor 112 of FIG. 5 includes a blink quality calculator 520 to assess a quality or reliability of the blink data provided by the RF location tags. In the illustrated example, the blink quality calculator 520 uses the following equation:

Blink Quality=$a$[DQI health]+$b$[receiver health]+$c$[locate gap health]+$d$[locate rate]

In the illustrated example, the blink quality calculator 520 uses different values for one or more of the coefficients (i.e., the constants a, b, c, and d) compared to the HQM equation above. For example, the value of a may be one (1), and the value of b, c, and d may be zero (0). In such instances, the blink quality corresponds to the DQI health metric. Alternative approaches to blink quality are possible by, for example, assigning different values to the coefficients. The example health monitor 112 of FIG. 5 includes a receiver detector 522 to determine whether any of the receivers at a particular site are not contributing to the corresponding location system beyond a threshold. That is, the example receiver detector 522 determines whether any receiver is, for example, off-line or otherwise not functioning properly. The example GUI generator 512 of FIG. 5 populates the example table 1204 with the number of missing receivers determined by the example receiver detector 522.

The example health monitor 112 of FIG. 5 includes a site health classifier 524 to generate a value for the indicator 1202 of FIG. 12 to communicate an indication of the site health information. In the illustrated example, the site health classifier 524 combines the data generated by the receiver-per-locate calculator 518, the data generated by the blink quality calculator 520, and the data generated by the receiver presence detector 522 to generate a classification for the corresponding site. For example, the site health classifier 524 of FIG. 5 classifies each site as satisfactory or unsatisfactory. In the illustrated example, the site health classifier 524 compares one or more of the metrics generated by the example health monitor 112 to respective thresholds. That is, a threshold is defined for each of the metrics generated by the example health monitor 112 and the example site health monitor 112 determines whether each of the metrics meets or exceeds the corresponding threshold. For example, in connection with FIG. 12, the site health classifier 524 compares the receiver-per-locate metric to a first threshold defined for the receiver-per-locate metric, the blink quality metric to a second threshold defined for the blink quality metric, and the missing receiver metric to a third threshold defined for the missing receiver metric. In some examples, if one or more of the metrics is unsatisfactory (e.g., does not meet or exceed), the site health classifier 524 classifies the corresponding site as unsatisfactory. That is, only when all of the metrics are satisfactory does the example site health classifier 524 of FIG. 5 classify the site as satisfactory. Alternatively, the site health classifier 524 may require a majority of the metrics to be satisfactory for the site to be classified as satisfactory. The example GUI generator 512 of FIG. 5 configures the site health indicators 1202 according to the classifications generated by the site health classifier 524.

Example Apparatus

Figure 13:
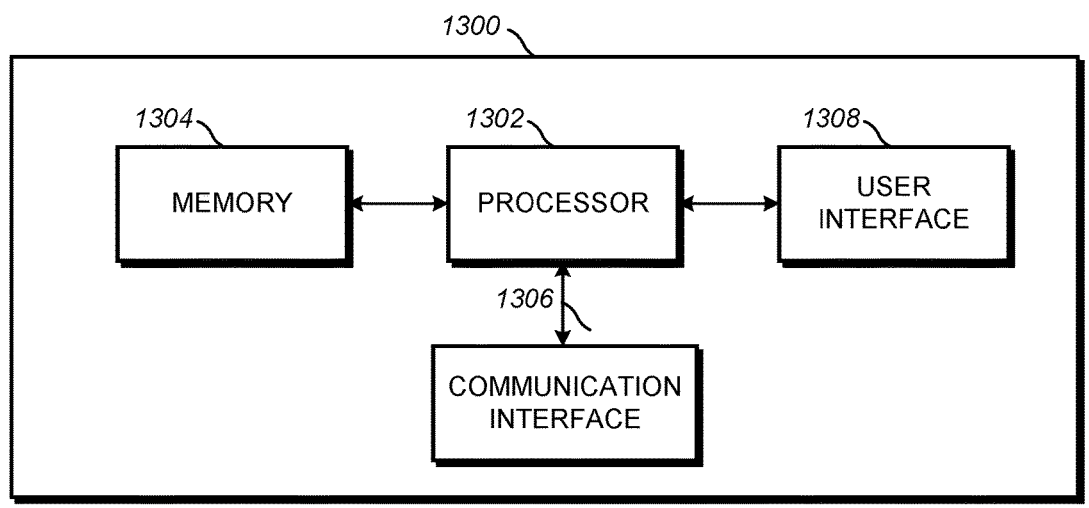
FIG. 13 illustrates an example apparatus that may be used to implement the example health monitor of FIGS. 1, 4 and/or 5 and/or to execute computer-readable instructions to implement the example system health monitor of FIGS. 4 and/or 5.

FIG. 13 shows a block diagram of components that may be included in an apparatus 1300 that is configured to generate and/or display site health information in accordance with teachings of this disclosure. In some examples, the apparatus 1300 of FIG. 13 may perform one or more methods corresponding to the operations described above in connection with, for example, the health monitor 112 of FIG. 1. As described above, the example health monitor 112 includes elements that can be implemented in a corresponding method. The example apparatus 1300 of FIG. 13 is embodied in or otherwise associated with, for example, the health monitor 112 of FIGS. 1, 4 and/or 5. In some examples, the apparatus 1300 is embodied by or enable operation of one or more blocks as described herein. The example apparatus 1300 comprises one or more processors, such as a processor 1302, one or more memories, such as memory 1304, communication circuitry 1306, and a user interface 1308. The processor 1302 can be, for example, a microprocessor that is configured to execute software instructions and/or other types of code portions for carrying out defined operations, some of which are discussed herein. The processor 1302 may communicate internally using data bus, for example, which may be used to convey data, including program instructions, between processor 1302 and the memory 1304.

The memory 1304 includes one or more non-transitory storage media such as, for example, volatile and/or non-volatile memory that may be either fixed or removable. The memory 1304 may be configured to store information, data, applications, instructions or the like for enabling the apparatus 1300 to carry out various functions in accordance with examples disclosed herein. For example, the memory 1304 may be configured to buffer input data for processing by the processor 1302. Additionally or alternatively, the memory 1304 is configured to store instructions for execution by the processor 1302. The memory 1304 is considered primary memory and be included in, for example, RAM or other forms of volatile storage which retain its contents only during operation, and/or the memory 1304 is included in non-volatile storage, such as ROM, EPROM, EEPROM, FLASH, or other types of storage that retain the memory contents independent of the power state of the apparatus 1300. In some examples, the memory 1304 is included in a secondary storage device, such as external disk storage, that stores large amounts of data. In some embodiments, the disk storage may communicate with the processor 1302 using an input/output component via a data bus or other routing component. The secondary memory may include a hard disk, compact disk, DVD, memory card, or any other type of mass storage type.

In some examples, the processor 1302 is configured to communicate with external communication networks and devices using the communications circuitry 1306, and may use a variety of interfaces such as data communication oriented protocols, including X.25, ISDN, DSL, among others. The communications circuitry 1306 may incorporate a modem for interfacing and communicating with a standard telephone line, an Ethernet interface, cable system, and/or any other type of communications system. Additionally, the processor 1302 may communicate via a wireless interface that is operatively connected to the communications circuitry 1306 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1×EV-DO, GPRS, W-CDMA, LTE, and/or any other protocol.

The user interface 1308 is in communication with the processor 1302 to provide output to the user and to receive input. For example, the user interface 1308 includes a display and, in some embodiments, may also include a keyboard, a mouse, a joystick, a touch screen, touch areas, soft keys, a microphone, a speaker, or other input/output mechanisms. The processor 1302 may comprise user interface circuitry configured to control at least some functions of one or more user interface elements such as a display and, in some embodiments, a speaker, ringer, microphone and/or the like. The processor 1302 and/or user interface circuitry including the processor 1302 may be configured to control one or more functions of one or more user interface elements through computer program instructions (e.g., software and/or firmware) stored on, for example, the memory 1304 which is accessible to the processor 1302.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

That which is claimed:

1. An apparatus configured to generate a hub quality matrix, the apparatus comprising:
   a processor; and
   memory including machine-readable instructions that, when executed, cause the processor to:
   generate the hub quality matrix using at least two values of:
   a data quality value generated based on location data, the location data generated based on blink data transmitted by tags and received by receivers at a site,
   a receiver health value generated based on a receive rate of respective ones of the receivers,
   a locate gap value generated based on amounts of time between location estimations, and
   a locate rate value generated based on a ratio of a first amount of the location estimations and a second amount of tracked participants at the site; and
   output the hub quality matrix.

2. An apparatus as defined in claim 1, wherein the instructions, when executed, cause the processor to generate the hub quality matrix by applying a site specific multiplier to each of the data quality value, the receiver health value, the locate gap value, and the locate rate value.

3. An apparatus as defined in claim 2, wherein the site specific multiplier is different for each of the data quality value, the receiver health value, the locate gap value, and the locate rate value.

4. An apparatus as defined in claim 1, wherein the instructions, when executed, cause the processor to output the hub quality matrix as a display viewable on the apparatus.

5. An apparatus as defined in claim 1, wherein the instructions, when executed, cause the processor to generate the hub quality matrix over a period of time.

6. An apparatus as defined in claim 1, wherein the instructions, when executed, cause the processor to generate the data quality value based on a plurality of blink data detection times and a plurality of blink data transmission times.

7. An apparatus as defined in claim 1, wherein the instructions, when executed, cause the processor to generate the data quality value by determining a ratio of total number of bins to a number of bins having a data quality indicator below a threshold.

8. An apparatus as defined in claim 1, wherein the instructions, when executed, cause the processor to generate a screen of a user interface including an element of a first color when the receiver health value meets a threshold and of a second color when the receiver health value does not meet the threshold.

9. An apparatus as defined in claim 1, wherein the instructions, when executed, cause the processor to generate the locate gap value by identifying a first number of the amounts of time between the location estimations that are less than a first threshold, and by identifying a second number of the amounts of time between the location estimations that are less than a second threshold greater than the first threshold.

10. An apparatus as defined in claim 9, wherein the instructions, when executed, cause the processor to generate the locate gap value by identifying a third number of the amounts of time between the location estimations that are greater than a third threshold greater than the second threshold.

11. A non-transitory machine readable storage device comprising instructions that, when executed, cause a machine to at least:
   receive location data generated based on blink data transmitted by tags and received by receivers at a site;
   generate a quality hub matrix value by combining at least two of:
   a data quality value generated based on the received location data,
   a receiver health value generated based on a receive rate of respective ones of the receivers,
   a locate gap value generated based on amounts of time between location estimations, and
   a locate rate based on a ratio of a first amount of the location estimations and a second amount of tracked participants at the site; and
   output the quality hub matrix value.

12. A non-transitory machine readable storage device as defined in claim 11, wherein the instructions, when executed, cause the machine to output the quality hub matrix value by providing the quality hub matrix value to a display.

13. A non-transitory machine readable storage device as defined in claim 11, wherein the instructions, when executed, cause the machine to combine the at least two of the data quality value, the receiver health value, the locate gap value and the locate rate value by calculating a weighted sum of the at least two of the data quality value, the receiver health value, the locate gap value and the locate rate value.

14. A non-transitory machine readable storage device as defined in claim 11, wherein the data quality value is based on a plurality of blink data detection times and a plurality of blink data transmission times.

15. A non-transitory machine readable storage device as defined in claim 11, wherein the instructions, when executed cause the machine to generate the data quality value by determining a ratio of total number of bins to a number of bins having a data quality indicator below a threshold.

16. A non-transitory machine readable storage device as defined in claim 11, wherein the instructions, when executed, cause the machine to generate a screen of a user interface including an element of a first color when the receiver health value meets a threshold and of a second color when the receiver health value does not meet the threshold.

17. A non-transitory machine readable storage device as defined in claim 11, wherein the instructions, when executed, cause the machine to generate the locate gap value by identifying a first number of the amounts of time between the location estimations that are less than a first threshold, and by identifying a second number of the amounts of time between the location estimations that are less than a second threshold greater than the first threshold.

18. A non-transitory machine readable storage device as defined in claim 17, wherein the instructions, when executed, cause the machine to generate the locate gap value by identifying a third number of the amounts of time between the location estimations that are greater than a third threshold greater than the second threshold.

19. A method comprising:
receiving location data generated based on blink data transmitted by tags and received by receivers at a site;
generating, using a processor, a quality hub matrix value by combining at least two of:
a data quality value generated based on the received location data,
a receiver health value generated based on a receive rate of respective ones of the receivers,
a locate gap value generated based on amounts of time between location estimations, and
a locate rate based on a ratio of a first amount of the location estimations and a second amount of tracked participants at the site; and
outputting the quality hub matrix value.

\* \* \* \* \*